(12) United States Patent
Hagemark et al.

(10) Patent No.: US 6,317,134 B1
(45) Date of Patent: *Nov. 13, 2001

(54) SYSTEM SOFTWARE FOR USE IN A GRAPHICS COMPUTER SYSTEM HAVING A SHARED SYSTEM MEMORY AND SUPPORTING DM PBUFFERS AND OTHER CONSTRUCTS ALIASED AS DM BUFFERS

(75) Inventors: Bent Hagemark, Santa Clara; Angela Lai, Mountain View; Kevin Meier, Redwood City; Jonathan Wesener, Fremont; Brian Beach, Santa Cruz; John Wiltse Carpenter, San Francisco; Terrence Crane, Mountain View, all of CA (US)

(73) Assignee: Silicon Graphics, Inc., Mountain View, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/914,897

(22) Filed: Aug. 20, 1997

Related U.S. Application Data

(63) Continuation-in-part of application No. 08/713,414, filed on Sep. 13, 1996, now Pat. No. 6,070,002.

(51) Int. Cl.[7] .................................................. G06F 15/167
(52) U.S. Cl. ........................ 345/512; 345/509; 345/515; 345/203
(58) Field of Search .................................... 345/512, 509, 345/515, 203, 430–431; 711/147, 153

(56) References Cited

U.S. PATENT DOCUMENTS

| | | | |
|---|---|---|---|
| 5,054,360 | 10/1991 | Lisle et al. ............................ | 84/645 |
| 5,212,742 | 5/1993 | Normile et al. ...................... | 382/234 |
| 5,373,327 | 12/1994 | Mcgee et al. ......................... | 348/645 |
| 5,430,841 | * 7/1995 | Tannenbaum et al. ............... | 345/502 |
| 5,467,459 | 11/1995 | Alexander et al. ............. | 395/497.04 |
| 5,535,390 | * 7/1996 | Hildebrandt .......................... | 711/154 |
| 5,625,829 | 4/1997 | Gephart et al. ...................... | 395/306 |
| 5,659,715 | * 8/1997 | Wu et al. .............................. | 711/170 |
| 5,717,436 | * 2/1998 | Cahill, III ............................ | 345/202 |

(List continued on next page.)

OTHER PUBLICATIONS

Nowatzyk et al., "The S3.mp Scalable Shared Memory Multiprocessor"; IEEE, 1994.
BIT 3, computer Corporation, Data Sheet for Model 608; http://www.bit3.com/ds608.html, Dec. 18, 1996.
Chase et al., "Some Issues For Single Address Space Systems"; IEEE, 1993.
Norton, Mark J., "A Dockable Digital Disk Recorder," in Moving Images: Meeting the Challenges, 137th SMPTE Technical Conference and World Media Expo. pp. 260–269, (Sep., 1995).
"The MPACT™ Media Engine: A Completely New Approach to Multimedia Integration," pp. 1–6, (Chromatic Research, Inc., 1995).

*Primary Examiner*—Raymond J. Bayerl
*Assistant Examiner*—Sy D. Luu
(74) *Attorney, Agent, or Firm*—Sterne, Kessler, Goldstein & Fox PLLC

(57) ABSTRACT

A computer system having a shared system memory, and system software in the computer system, are described herein. The computer system has a general purpose, shared system memory that is used for all processing, including video input/output operations, image conversion operations, and rendering operations. In operation, a digital media (DM) Pbuffer is created. The DM Pbuffer is aliased as a DM buffer in the system memory. This is done by storing in a color buffer identifier of the DM Pbuffer an identifier of the DM buffer. Thereafter, all graphical rendering operations directed to the DM Pbuffer are actually performed using the DM buffer.

14 Claims, 26 Drawing Sheets

U.S. PATENT DOCUMENTS

| | | | | |
|---|---|---|---|---|
| 5,732,224 | * | 3/1998 | Gulick et al. | 395/280 |
| 5,748,203 | * | 5/1998 | Tang et al. | 345/521 |
| 5,774,132 | * | 6/1998 | Uchiyama | 345/503 |
| 5,784,698 | * | 7/1998 | Brady et al. | 711/171 |
| 5,797,028 | * | 8/1998 | Gulick et al. | 712/32 |
| 5,818,469 | * | 10/1998 | Lawless et al. | 345/522 |
| 5,854,637 | * | 12/1998 | Sturges | 345/512 |
| 5,854,638 | * | 12/1998 | Tung | 345/512 |

* cited by examiner

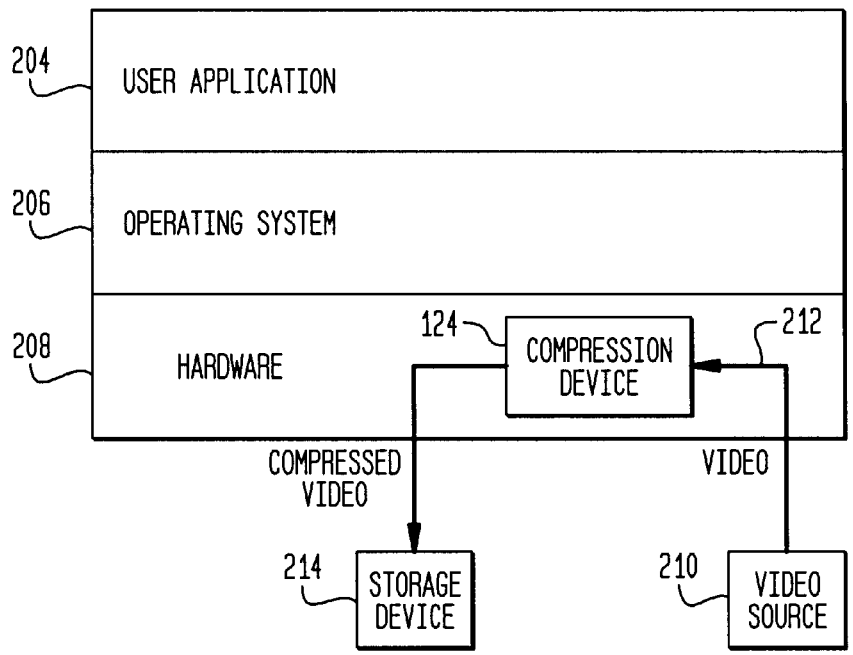
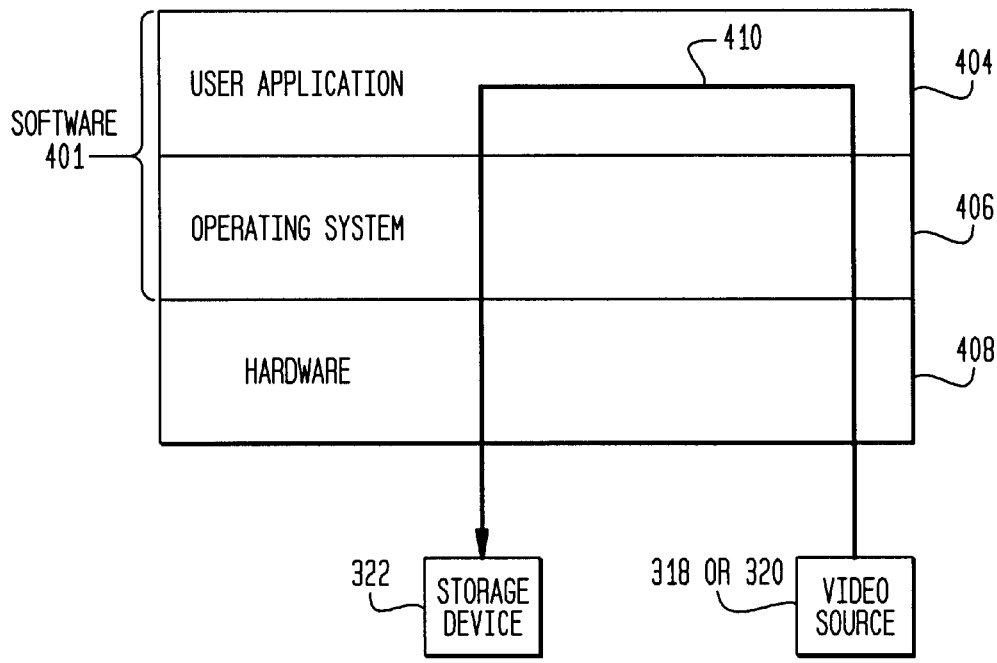

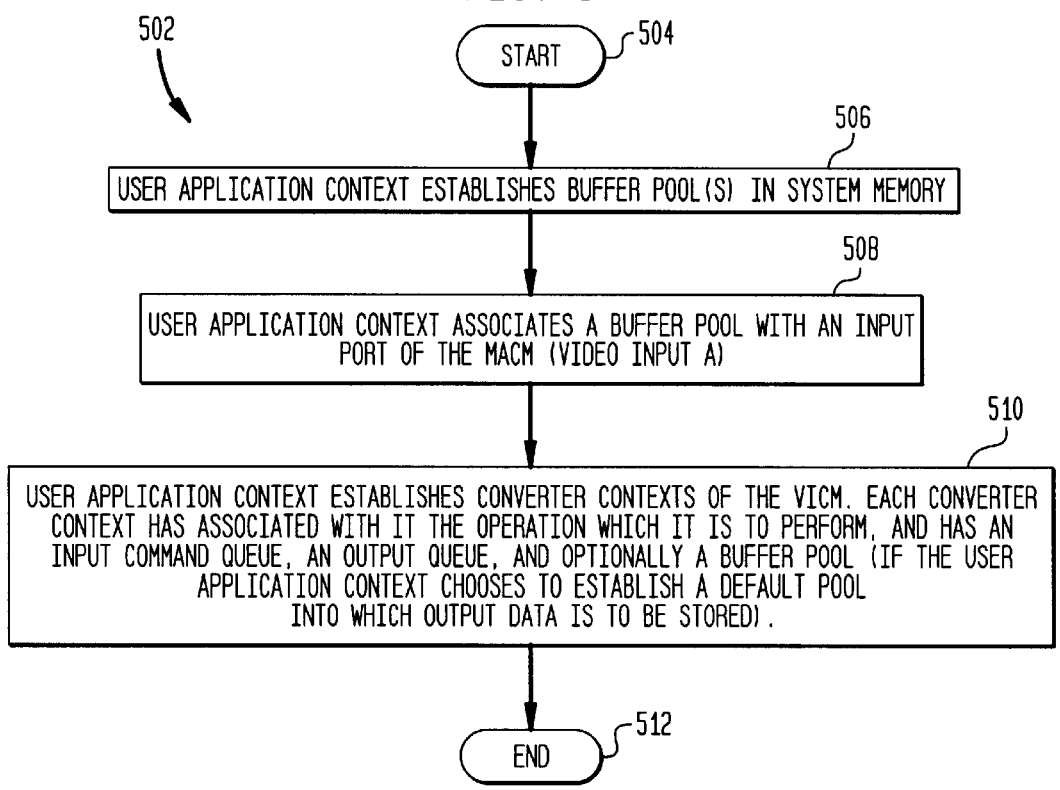

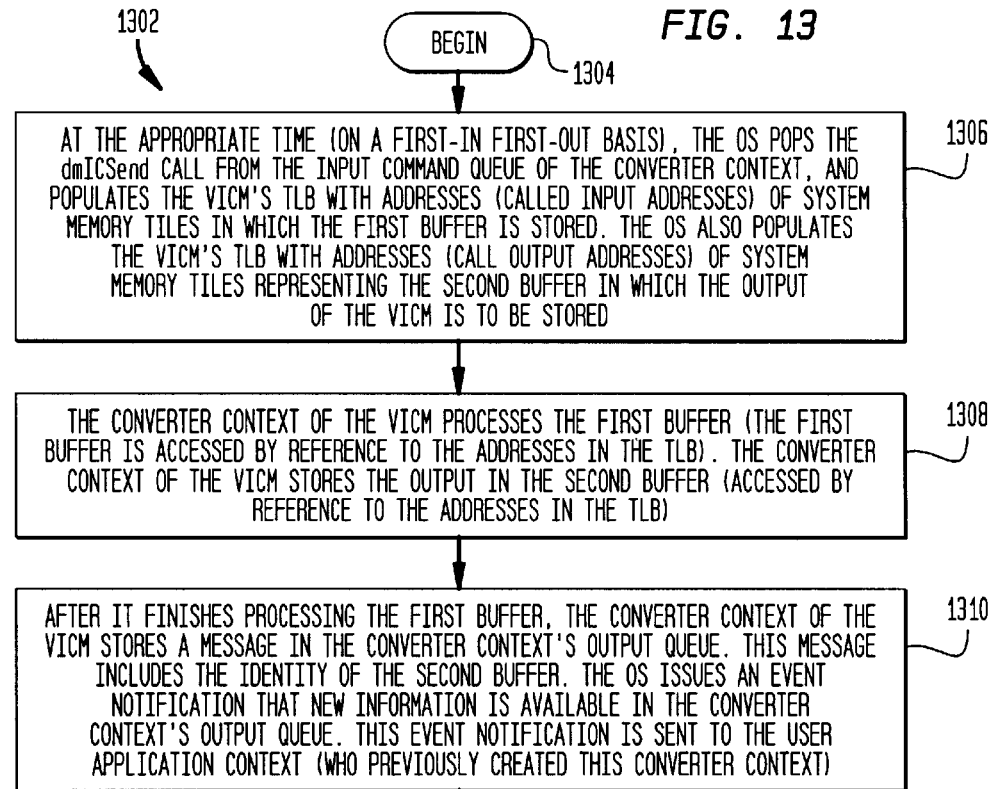
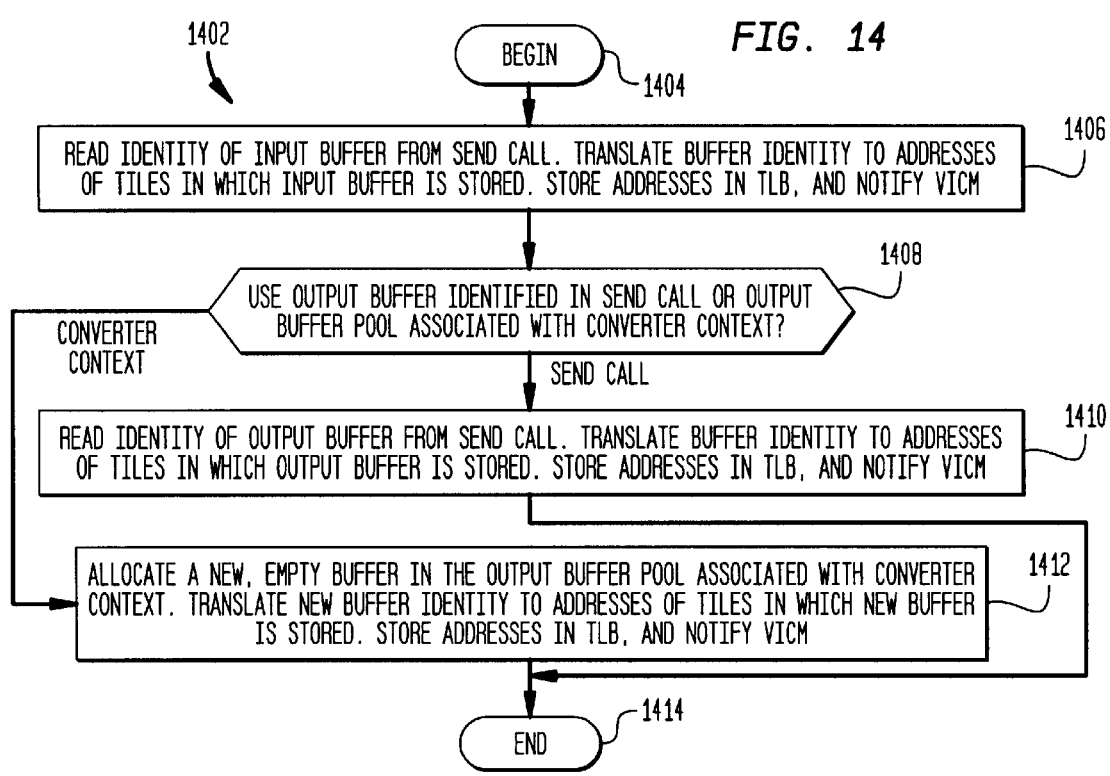

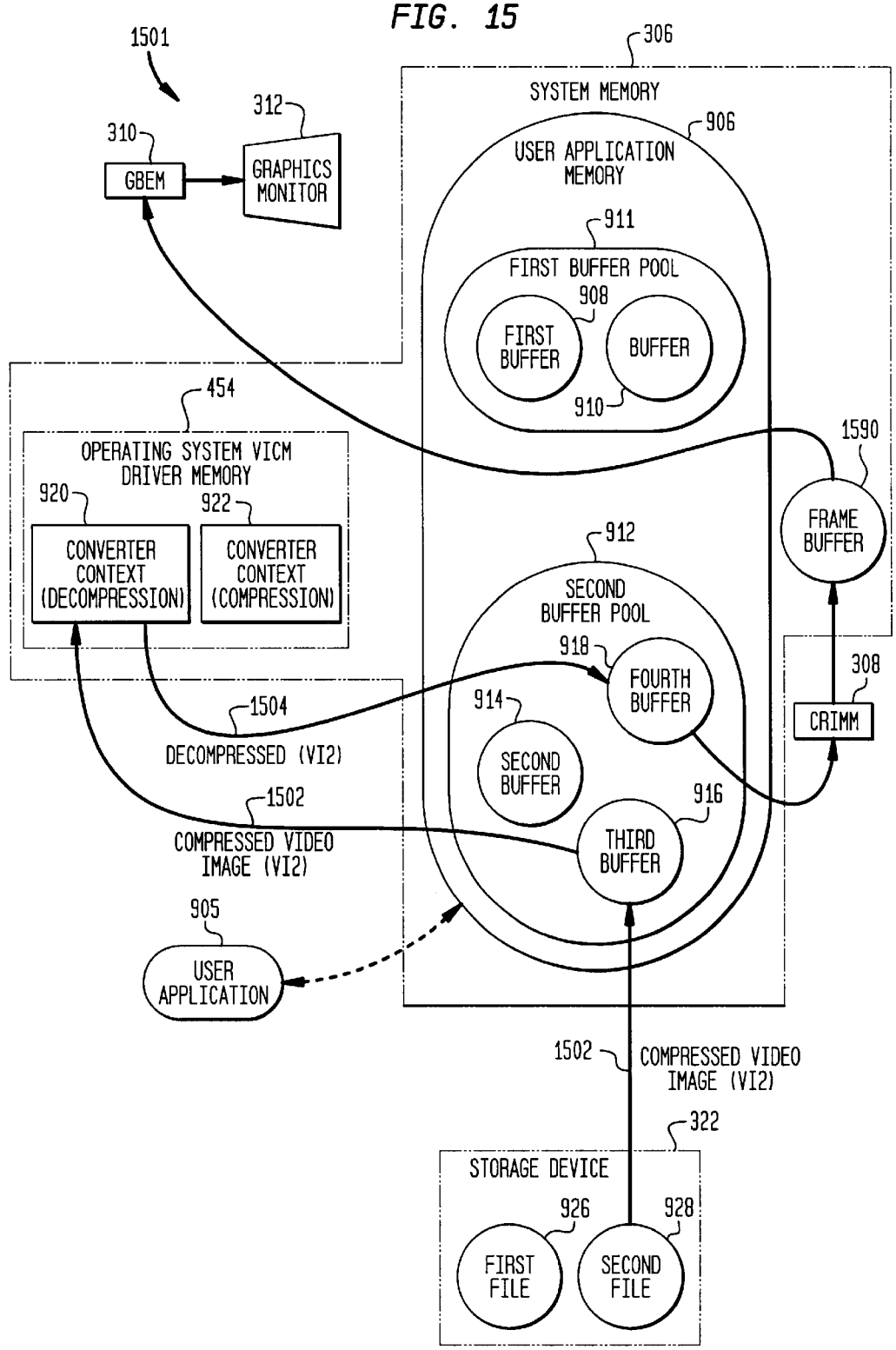

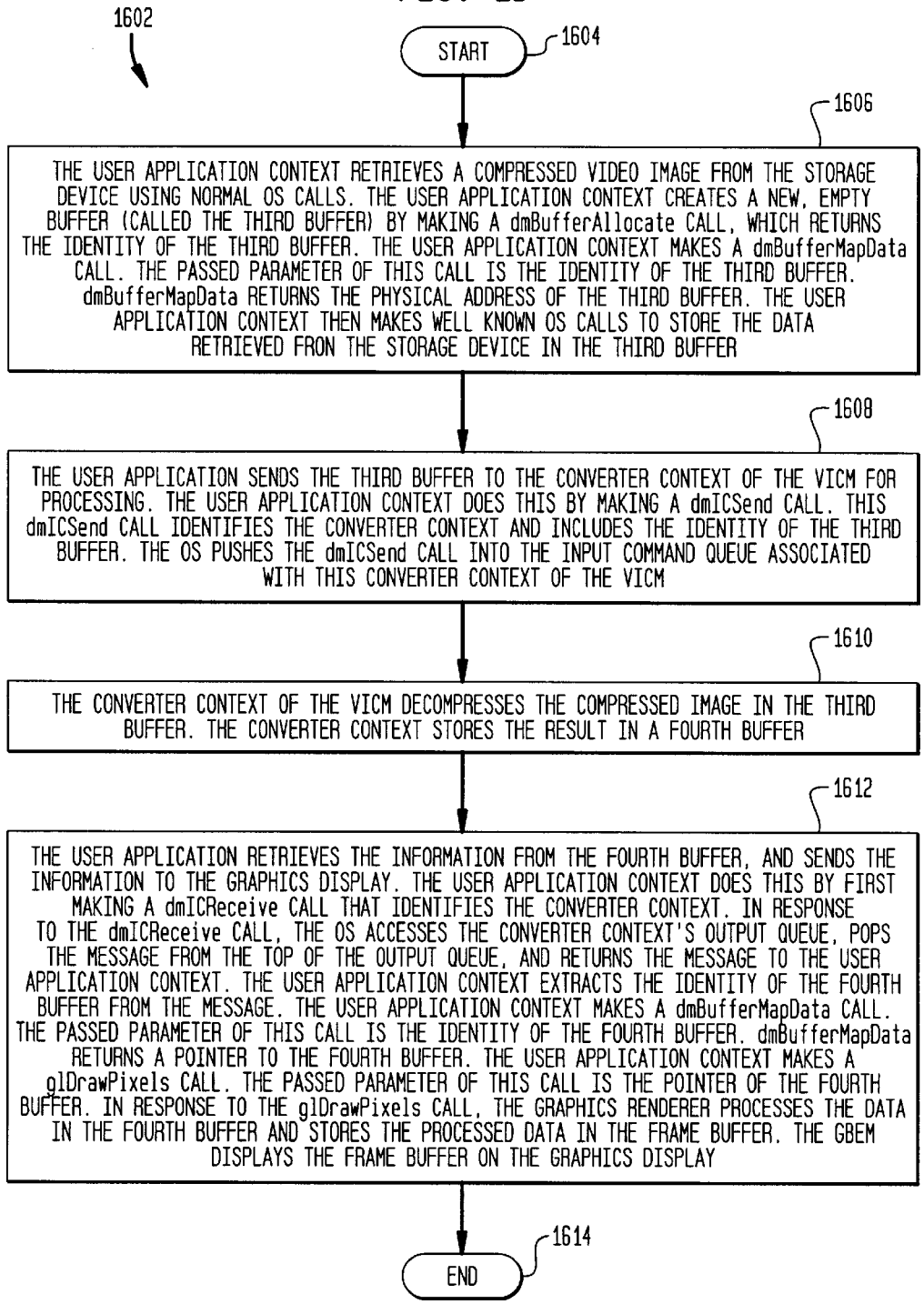

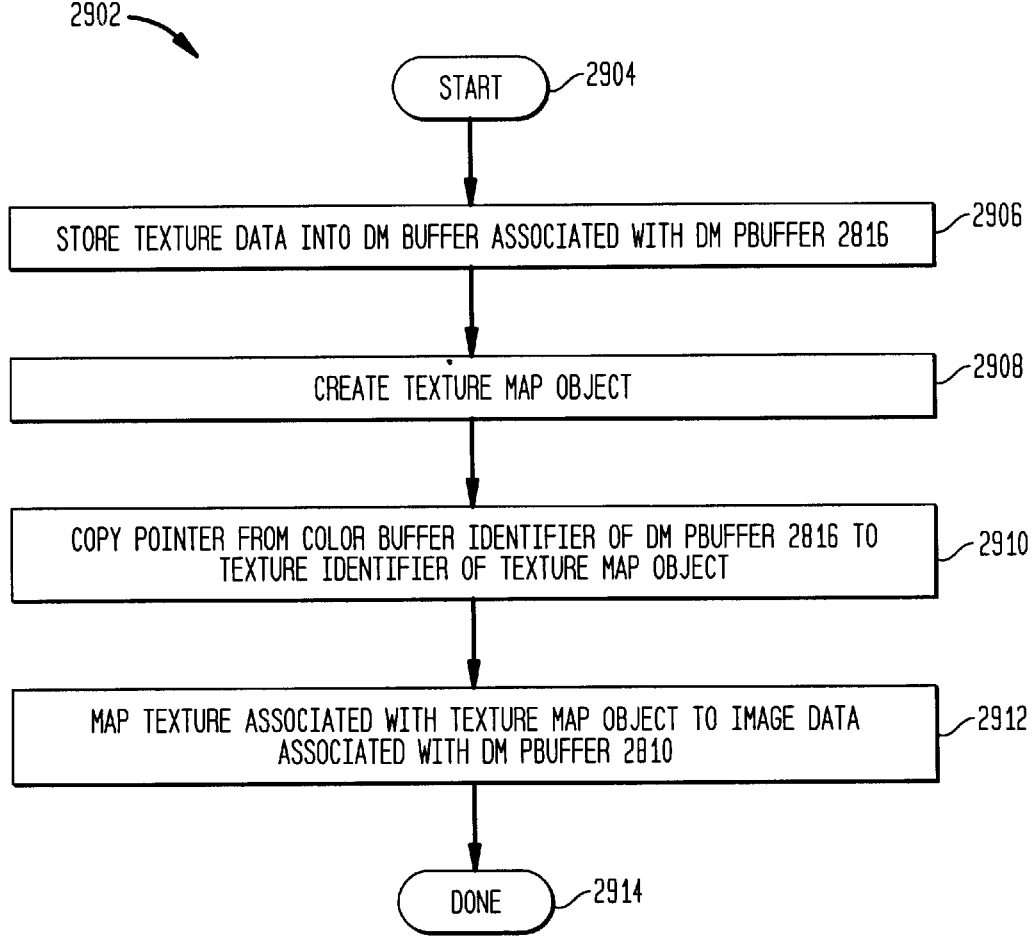

SYSTEM SOFTWARE FOR USE IN A GRAPHICS COMPUTER SYSTEM HAVING A SHARED SYSTEM MEMORY AND SUPPORTING DM PBUFFERS AND OTHER CONSTRUCTS ALIASED AS DM BUFFERS

CROSS-REFERENCE TO OTHER APPLICATIONS

This is a Continuation-In-Part application of application Ser. No. 08/713,419, filed Sep. 13, 1996 (now U.S. Pat. No. 6,070,002), incorporated herein by reference in its entirety.

The following applications of common assignee are related to the present application:

"Unified Memory Computer Architecture With Dynamic Graphics Memory Allocation," Ser. No. 08/713,779, filed Sep. 13, 1996 (now U.S. Pat. No. 6,104,417), incorporated herein by reference in its entirety.

"Compression and Decompression Scheme Performed on Shared Workstation Memory By Media Coprocessor," Ser. No. 08/713,599, filed Sep. 13, 1996 (now U.S. Pat. No. 5,768,445), incorporated herein by reference in its entirety.

BACKGROUND OF THE INVENTION

1. Field of the Invention

The present invention relates generally to a computer system having a shared system memory, and more particularly to system software in a computer system having a shared system memory.

2. Related Art

FIG. 1 is a block diagram of a conventional computer system 102. The computer system 102 is "bus centric," in that all components are connected to and communicate with each other via a bus 116. In particular, a CPU 104 (central processing unit), system memory 106, graphics rendering hardware 108, and an I/O (input/output) interface 118 are connected to a bus 116, and communicate with each other via the bus 116.

The system memory 106 is the main memory in the computer system 102, and it is implemented as random access memory (RAM). However, the system memory 106 is not the only RAM in the computer system 102. The computer system 102 also includes a frame buffer 110 in a graphics memory 109, which is implemented using VRAM (video random access memory). The graphics memory 109 and the frame buffer 110 located therein are dedicated for use by the rendering hardware 108. In operation, the rendering hardware 108 performs graphical operations and renders a graphical image to the frame buffer 110. A graphics back end (GBE) 112 displays the graphical image on a graphics monitor 114.

The computer system 102 also includes a video buffer RAM 122 that is used for direct communication of video data to the compression module 124 (which may represent a video compression computer card, for example). There is also a compression RAM 123 that is used for compression operations. In operation, a video source 120 (such as a video camera) generates a video signal. The bandwidth of the video signal is approximately 20 Mbytes/second. Typically, "consumers" or "users" of the video signal have a smaller bandwidth. For example, the storage device 126 (such as a disk drive) usually has a bandwidth of 2–4 Mbytes/second. A communication network (not shown) usually has a bandwidth of approximately 1 Mbyte/second. Thus, it is necessary to compress the video signal.

Accordingly, the video signal is stored in the video buffer RAM 122. The compression module 124 compresses the video data stored in the video buffer RAM 122 using the compression RAM 123 to hold compression task state information such as inter-frame reference data, and then transfers the compressed video data to the I/O interface 118. The I/O interface 118 sends the compressed video data to an external device, such as a storage device 126 or to a destination over a communication network (not shown). In other systems, data is transferred directly from the compression module 124 to the storage device 126 or other external device.

Thus, the computer system 102 has multiple RAMS: the system memory 106, the graphics memory 109, the video buffer RAM 122, and the compression RAM 123. It is costly to have multiple RAMS. This cost manifests itself in increased system cost (since more RAMs cost more money) and increased system size (since more RAMs take up more space). Thus, the conventional computer system 102 is not ideal since it requires multiple RAMS.

The system memory 106 is general purpose, but the graphics memory 109, the video buffer RAM 122, and the compression RAM 123 are dedicated to specific functions. The graphics memory 109 can be used only for graphics operations, and the video buffer RAM 122 and compression RAM 123 can be used only for compression operations. Thus, a significant portion of the RAM in the computer system 102 can be used only for particular functions. Accordingly, the conventional computer system 102 is not ideal because its RAMs are not flexible.

The inflexibility of the compression RAM 122 extends to the entire video compression path. The compression module 124 and compression RAM 122 that comprise the video compression path are capable of opening with a single video signal. Thus, the compression path of the conventional computer system 102 is inflexible because it cannot simultaneously work with multiple video signals.

Also, the compression module 124 and compression RAM 122 can only work with one video signal type. The type of video signal that the compression module 124 and compression RAM 122 can work with is determined when the computer system 102 is manufactured. Thus, the compression path of the conventional computer system 102 is inflexible because it cannot work with multiple types of video signals.

This latter inflexibility of the compression path, and the inflexibility of the computer system 102 as a whole, results from its manner of operation. As shown in FIG. 2, processing of a video signal by the conventional computer system 102 is performed entirely by hardware 208 (the hardware 208 includes the video buffer RAM 122, the compression RAM 123, compression module 124, and I/O interface 118). Such processing is represented by path 212, which does not extend into the operating system layer 206 or the user application layer 204. Since it is performed entirely by hardware 208, video compression functionalities and capabilities are essentially "hardwired" into the computer system 102. Thus, the compression device 124 and other related hardware have limited applicability because they are hardwired to and embedded in the video input/output path.

This inflexibility can be alleviated somewhat by enabling user applications in the user application layer 204, and executing in the CPU 104, to manipulate the video signal. To do this, graphical data representative of the video signal must be copied from the graphics memory 109 into the system memory 106. A user application can then manipulate the graphical data while it is stored in the system memory 106 (note that the user application does not have access to data stored in the graphics memory 109). In order to display the graphical data, the graphical data must be copied from the system memory 106 back to the graphics memory 109 (in particular, back to the frame buffer 110 in the graphics memory 109).

Thus, in order to obtain some level of flexibility in the system 102 of FIG. 1, it is necessary to copy and/or move data from one memory component to another memory component, such as from the graphics memory 109 to the system memory 106, and vice versa. These copy and move operations degrade system performance because they are time consuming and resource intensive. Accordingly, any flexibility in the conventional system 102 of FIG. 1 is achieved only at the cost of significant system performance.

SUMMARY OF THE INVENTION

Briefly stated, the present invention is directed to a computer system having a shared system memory, and to system software in the computer system. One or more user applications execute in the computer system. Each user application has one or more device contexts.

The computer system has a general purpose, shared system memory that is used for all processing, including video input/output operations and image conversion operations. The computer system also has a multimedia access and control module (MACM), which is the input/output interface between the computer system and the external world In operation, the MACM receives, at one of its video input ports, video data comprising a video image (such as a frame or a field). The MACM stores the video image in a first buffer contained in a first buffer pool of the system memory. The first buffer pool was previously created by a user application. The user application previously associated the first buffer pool with the MACM's video input port.

A video imaging and compression module (VICM) performs image conversion operations. Each user application creates one or more converter contexts of the VICM. Each converter context is capable of performing an image conversion operation. In operation, a converter context of the VICM performs an image conversion operation on the video image stored in the first buffer. Then, the converter context stores the results of the image conversion operation in a second buffer contained in a second buffer pool of the system memory. The second buffer pool is also associated with the user application.

A CPU rendering I/O and memory module (CRIMM) performs graphical rendering operations. According to the invention, a digital media (DM) Pbuffer is created. The DM Pbuffer is aliased as a DM buffer in the system memory. This is done by storing in a color buffer identifier of the DM Pbuffer an identifier of the DM buffer. Thereafter, all graphical rendering operations directed to the DM Pbuffer are actually performed using the DM buffer.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE FIGURES

The present invention will be described with reference to the accompanying drawings, wherein:

FIG. 2 illustrates a conventional system software architecture;

FIG. 4A illustrates a system software architecture according to a preferred embodiment of the present invention;

FIGS. 5, 10, 11, 12, 13, 14, 16, 17, and 19 are flowcharts representing the preferred operation of the present invention;

FIG. 15 shows a path from a storage device to a GBEM of the computer system shown in FIG. 3;

FIG. 29 is a flowchart depicting the operational steps of the scenario of FIG. 28.

DETAILED DESCRIPTION OF THE PREFERRED EMBODIMENTS

Overview of the Present Invention

Figure 3:
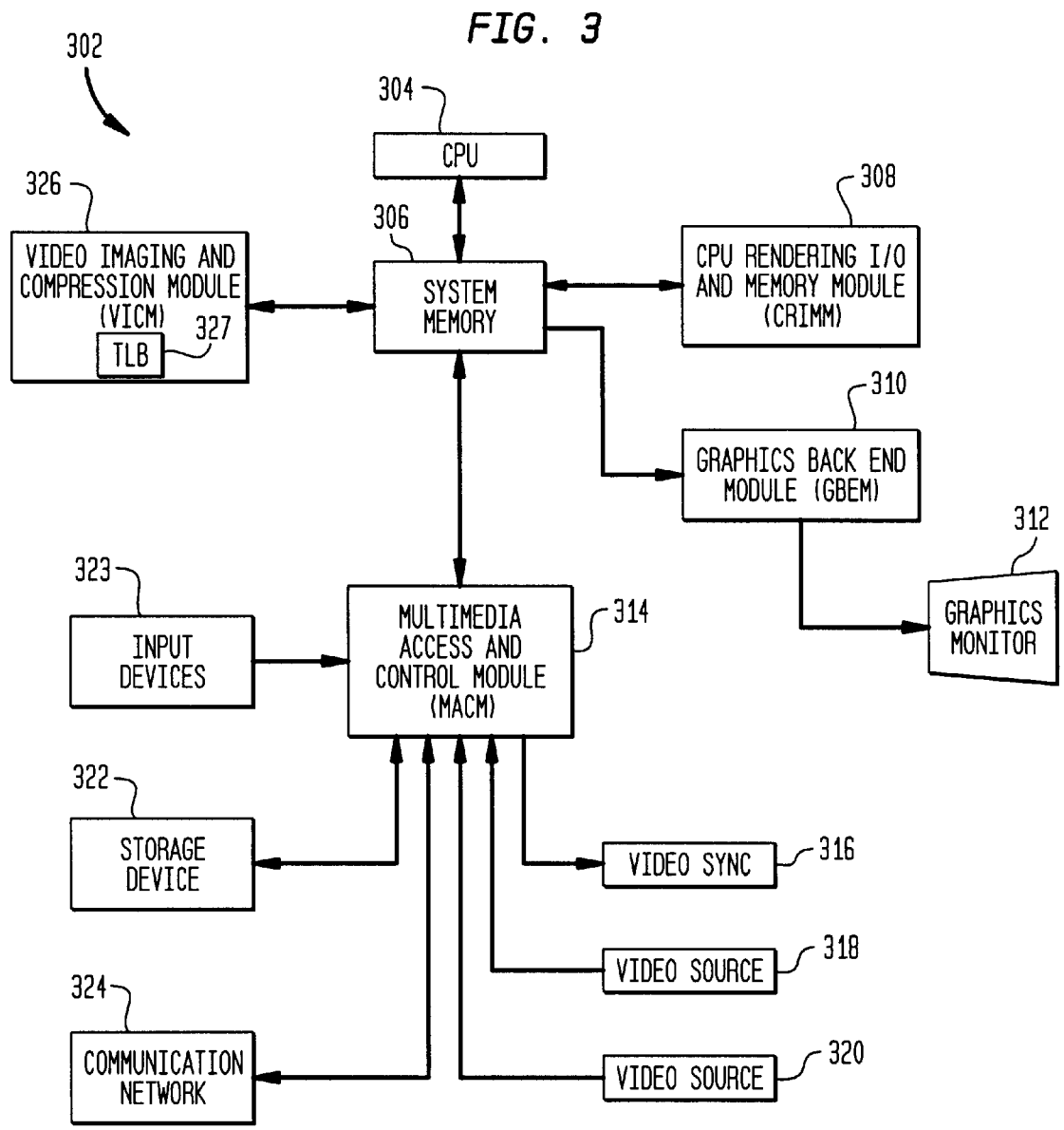
FIG. 3 is a block diagram of a computer system according to a preferred embodiment of the present invention.

Referring to FIG. 3, the present invention is directed to a computer system 302 having a shared system memory 306. The invention is also directed to the system software that operates in the computer system 302.

The system memory 306 is used for all processing, including CPU (central processing unit) processing and input/output processing (including video input and output processing). The system memory 306 is also used for graphics processing, and takes the place of a frame buffer. The system memory 306 is further used for image conversion processing (including compression and decompression processing), and takes the place of a video buffer RAM and a compression RAM. According to the present invention, components coupled to and/or having access to the system memory 306 may interact and communication with each other, and share data with each other, via the system memory 306.

The system memory 306 is implemented as RAM (random access memory). Preferably, the system memory 306 is at least 64 Mbytes, but other configurations are possible.

The system memory 306 is general purpose. It is not dedicated for any particular function. The computer system 302 does not include any RAM dedicated for use with graphics processing, video I/O, or image conversion processing. Consequently, the computer system 302 is less costly both in terms of size and financial cost) than conventional computer systems having general purpose and dedicated RAMs.

Figure 1:
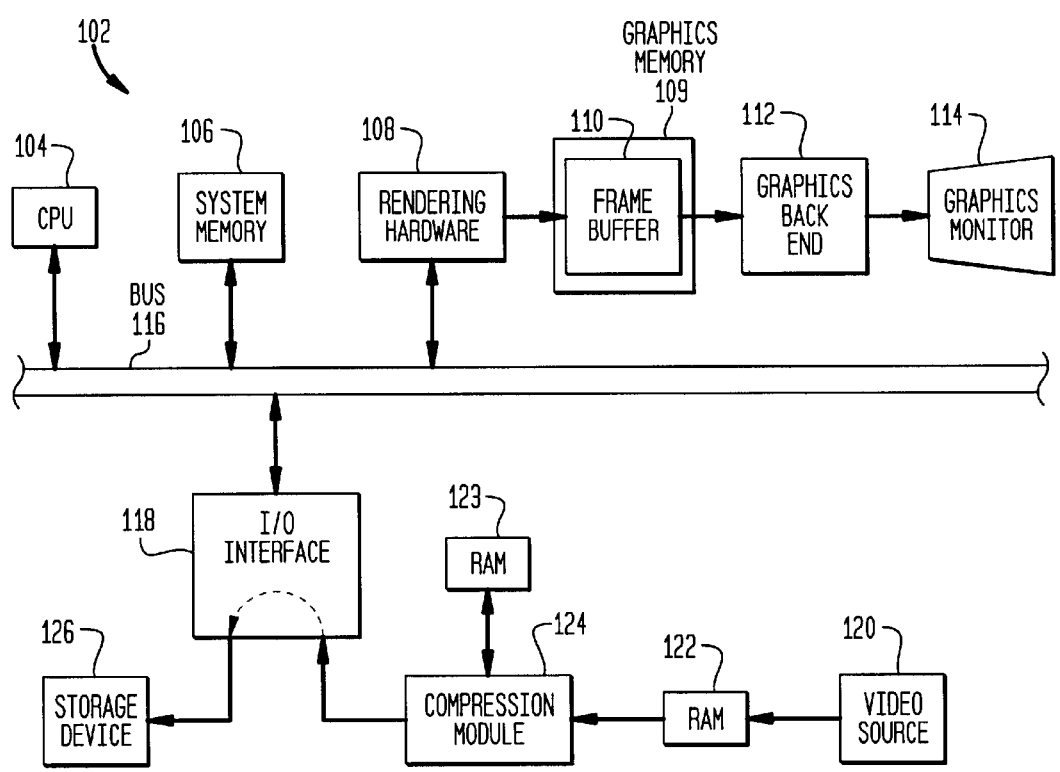
FIG. 1 is a block diagram of a conventional computer system.

The computer system 302 also includes a central processing unit (CPU) 304, and a video imaging and compression engine or module (VICM) 326. The VICM 326 performs image conversion functions, which are functions that convert at least a part of an image from a first form to a second form. Image conversion functions include video imaging and compression functions, such as data compression, data decompression, color space conversion, etc. The VICM 326 is connected to system memory 306, and has direct access to system memory 306. This differs from conventional computer systems, where the data compression/decompression modules are not connected to system memory (see FIG. 1, for example).

The computer system 302 also includes a CPU rendering I/O and memory engine or module (CRIMM) 308. The CRIMM 308 controls the system memory 306. The CRIMM 308 also performs graphical operations, such as rendering operations, and is also herein called a graphics rendering unit. The CRIMM 308 is connected to the system memory 306, and has direct access to system memory 306.

The computer system 302 further includes a graphics back end module (GBEM) 310, which is connected to a graphics monitor 312. The GBEM 310 retrieves graphics data from the frame buffers formed in the system memory 306, and displays the graphics data on the graphics monitor 312. The GBEM 310 is connected to system memory 306.

The CRIMM 308 is not directly connected to the GBEM 310. This is unlike conventional computer systems, where the graphics rendering engine is connected to the graphics back end via a frame buffer, which is dedicated to graphics operations (see FIG. 1). In the present invention, the CRIMM 308 is connected to the GBEM 310 via system memory 306, which is general purpose memory.

The computer system 302 further includes a multimedia access and control engine or module (MACM) 314, which is connected to system memory 306, and which has direct access to system memory 306. The MACM 314 operates an the input/output (I/O) interface between the computer system 302 and the external world. Connected to the MACM 314 are one or more video sinks (also called video outputs), such as video sink 316. As used herein, the term video sink refers to a device which receives video data from the computer system 302. Examples of video sinks include video monitors, video recorders, video switches, broadcast equipment, etc. Also connected to the MACM 314 are one or more video sources (such as video cameras), such as video sources 318 and 320, a storage device 322 (such as a disk drive), a communication network 324 (such as the Internet), and input devices 323 (such as a keyboard and mouse).

As depicted in FIG. 3, the CPU 304, CRIMM 308, GBEM 310, MACM 314, VICM 326 are connected to and communicate with each other via the system memory 306. Accordingly, the computer system 302 of the present invention is "system memory centric." This is in contrast to conventional computer systems, such as that shown in FIG. 1, which are bus centric.

The system software of the present invention can be stored in computer program products (also called program storage devices), each of which comprises a computer useable medium. Such computer useable mediums include, but are not limited to, magnetic media, optical media, etc. The system software (also called computer program logic) enables or causes a computer to perform the functions described herein. The system software is recorded in a computer useable medium of a computer program product. Examples of computer program products include floppy disks, optical disks, computer tapes, hard drives, etc.

The computer system 302 is described in greater detail in U.S. application entitled "Computer System Architecture Having Dynamic Memory Allocation For Graphics," referenced above.

Overview of the System Software of the Present Invention

FIG. 4A generally depicts the system software architecture 302 of the present invention. According to the present invention, user applications 404 have the ability to direct the manipulation of real-time video. More particularly, user applications 404 have the ability to direct the per image flow of real-time video data between input/output processing (including video input and output processing), image conversion processing (including compression and decompression processing), and graphics rendering and processing. This is in addition to functions that user applications 404 typically participate in and/or control. As represented by path 410, for example, operations that take place in the path from the video source 318, 320 to the storage device 322 involve user applications 404, the operating system 406, and hardware 408. Such operations at least include input/output processing, image conversion processing, and graphics processing.

Figure 4B:
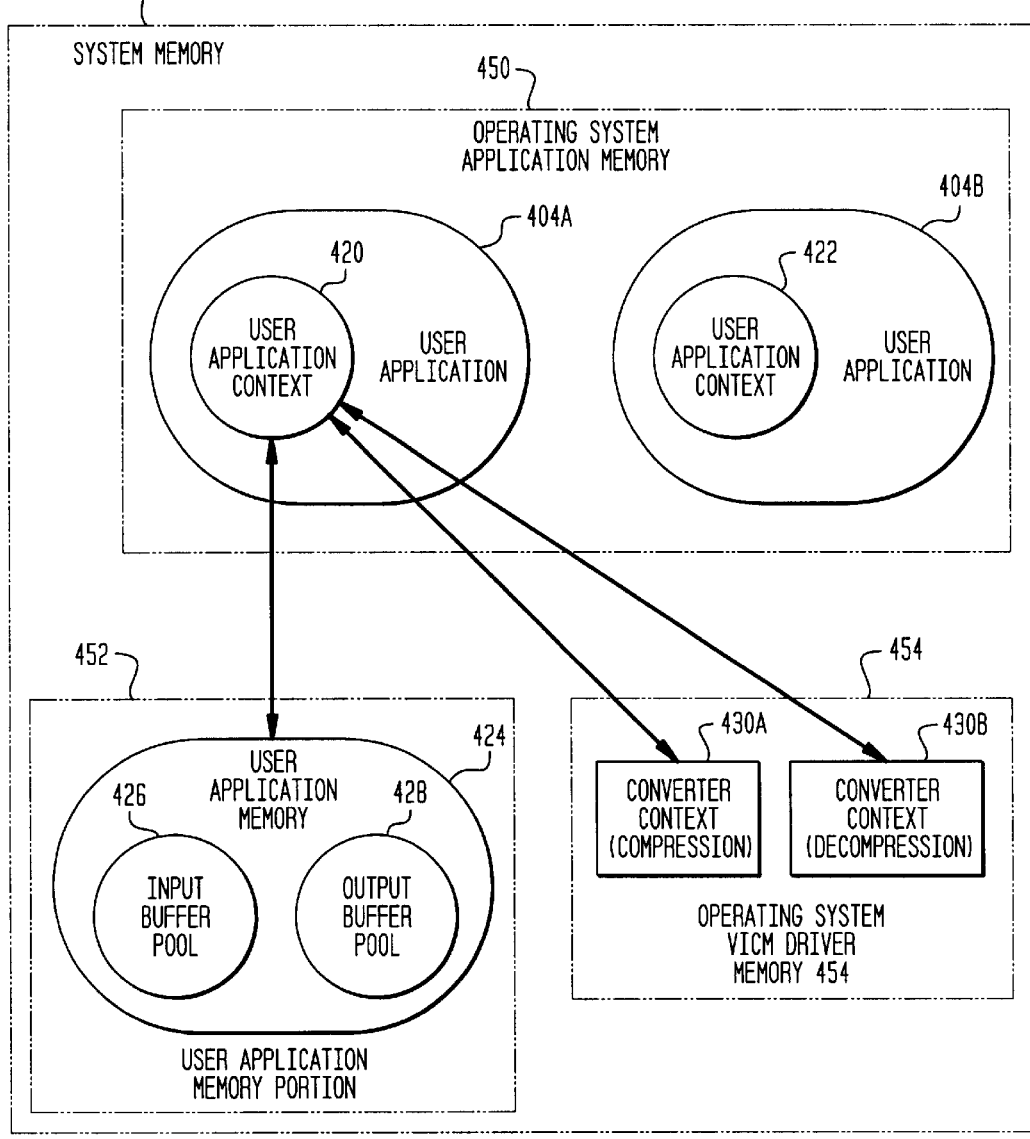
FIG. 4B illustrates the interaction between user applications, user application memory, and converter contexts.

Referring to FIG. 4B, there may be multiple user applications 404A, 404B executing simultaneously in the computer system 30. User applications 404 are maintained in an operating system application memory 450 that is within the system memory 306.

Each user application 404 includes a user application context 420, 422. For the purposes of the present invention, user applications and user application contexts are the same. Thus, the two terms are used interchangeably herein.

Each user application, such as user application 404A, operates with an exclusive portion of system memory 306, called the user application memory 424 (no other user applications use this portion of system memory 306). The user application memory 424 may include an input buffer pool 426 and an output buffer pool 428, for example. More generally, the user application memory 424 may include any number of buffer pools each of which may be used for input from and/or output to a device producing or accepting real-time video image data. Such devices include video I/O, compression/decompression, and graphics rendering and display. The user application memory 424 is part of a user application memory portion 452 of system memory 306.

Contained in each buffer pool 426, 428 are one or more digital media (DM) buffers. The terms "buffer" and "DM buffer" are used interchangeably herein Each buffer stores data for a video image. As used herein, the term video image refers to any video image unit, such as a frame, field (each frame includes two fields), etc. Preferably, a frame is 640 pixels by 480 pixels (such that a field is 640×240) at 30 frames/second Alternatively, a frame is 768×576 (and a field is 768×288) at 25 frames/second. The present invention preferably supports various video standards, such as NTSC used in the United States and Japan, and PAL used in Europe. However, other frame formats and standards may alternatively be used.

The unit of storage in the system memory 306 is called a tile. A tile is preferably 64 Kbytes, but other tile sizes are possible. The size of a buffer may be 1 Mbytes or larger. Thus, typically a buffer is formed from a plurality of tiles. The number of tiles needed to form a buffer is equal to:

(buffer size)/(tle size) The buffer size, tile size, and thus the number of tiles needed to form a buffer are implementation dependent.

Each user application, such as user application 404A, operates with one or more converter contexts, such as converter contexts 430A, 430B. The converter contexts 430 are maintained in an operating system VICM driver memory 454, which is part of system memory 306. The converter contexts created by one user application cannot be used by other user applications.

Each converter context 430 is a logical representation of the VICM 326. Each converter context 430 is capable of performing one of the imaging conversion functions from the set of functions supported by the VICM 326. Each user application 404 creates a converter context 430 for each imaging conversion function that it requires. For example, suppose that the user application 404A needs to be able to perform both data compression and decompression. In this case, the user application 404A creates a converter context 430A for compression, and a converter context 430B for decompression. Converter contexts are described in greater detail below.

Figure 18:
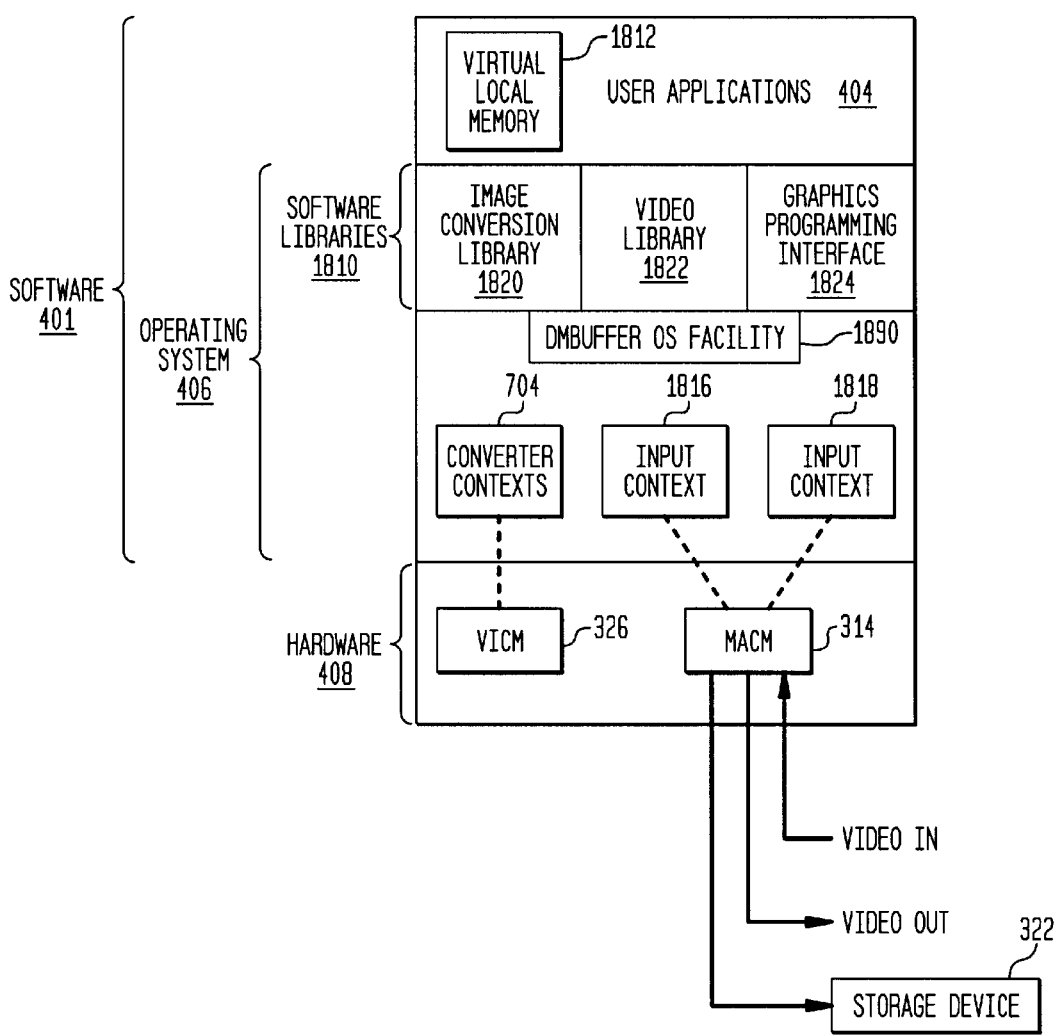
FIG. 18 illustrates the system software architecture of FIG. 4A in greater detail.

FIG. 18 illustrates the system software architecture 302 of the present invention in greater detail. The software 401 of the present invention includes user applications 404, software libraries 1810, and the operating system 406. The operating system 406 is preferably based on the UNIX operating system (as modified to operate as discussed herein). The operating system 406 could alternatively be based on other well known general purpose operating systems. The software libraries 1810 can be viewed as being partially part of the operating system 406, and partially being a distinct layer between the user applications 404 and the operating system 406.

In practice, the software libraries 1810, operating system 406, and hardware 408 are typically provided by the computer manufacturer, and the user applications 404 are typically provided by the user of the computer. However, some user applications 404 may also be provided by the computer manufacturer.

The software libraries 1810 include an image conversion library 1820, a video library 1822, and a graphics programming interface 1824. The image conversion library 1820 includes functions that, when called, cause converter contexts of the VICM 326 to perform video imaging functions, such as data compression and decompression. The video library 1822 includes functions for manipulating, accessing, and otherwise interacting with system memory 306 and DM buffers in the system memory 306.

The graphics programming interface 1824 includes functions for performing graphical operations. The graphics programming interface 1824 is preferably compatible with OpenGL, as extended to operate with DM buffers. OpenGL is well known and is described in many publicly available documents, such as Neider, Davis, and Woo, OpenGL Programming Guide, Addison Wesley, 1995, and OpenGL Architecture Review Board, OpenGL Reference Manual, Addison Wesley, 1995, incorporated herein by reference in their entireties. It should be understood, however, that the present invention is not limited to this embodiment. The present invention is adapted and intended to work with non-OpenGL systems, such as (but not limited to) QUICK-DRAW 3D, DIRECT 3D, X WINDOWS, etc.

The operating system 406 includes a DM buffer operating system facility 1890 which provides facilities for enabling the libraries 1810 to access, manipulate, and otherwise interact with DM buffers in system memory 306. Components in the computer system, such as the user applications 404, the VICM 326, the MACM 314, and the CRIMM 308, interact with each other via the DM buffers in system memory 306. These components may not be capable of directly interacting with each other. However, they all know how to interact with DM buffers. Thus, they interact with each other by interacting with the DM buffers. For example, one component may save data in a DM buffer. Another component may process the data in the DM buffer. Thus, these two components have effectively interacted with each other by interacting with the same DM buffer.

The software libraries 1810 present APIs (application programming interfaces) to the user applications 404. The user applications 404 access the functions, features, and capabilities of the software libraries 1810 via these APIs.

Each user application 404 must create its user application memory and its converter contexts. This is done by calls to the software libraries 1810 during an initialization phase, which is discussed in the following section.

User Application Initialization

FIG. 5 is a flowchart 502 depicting the operations that a user application performs during an initialization phase. The user application must perform the steps of flowchart 502 before it can access converter contexts. Flowchart 502 begins with step 504, where control immediately passes to step 506.

Figure 6:
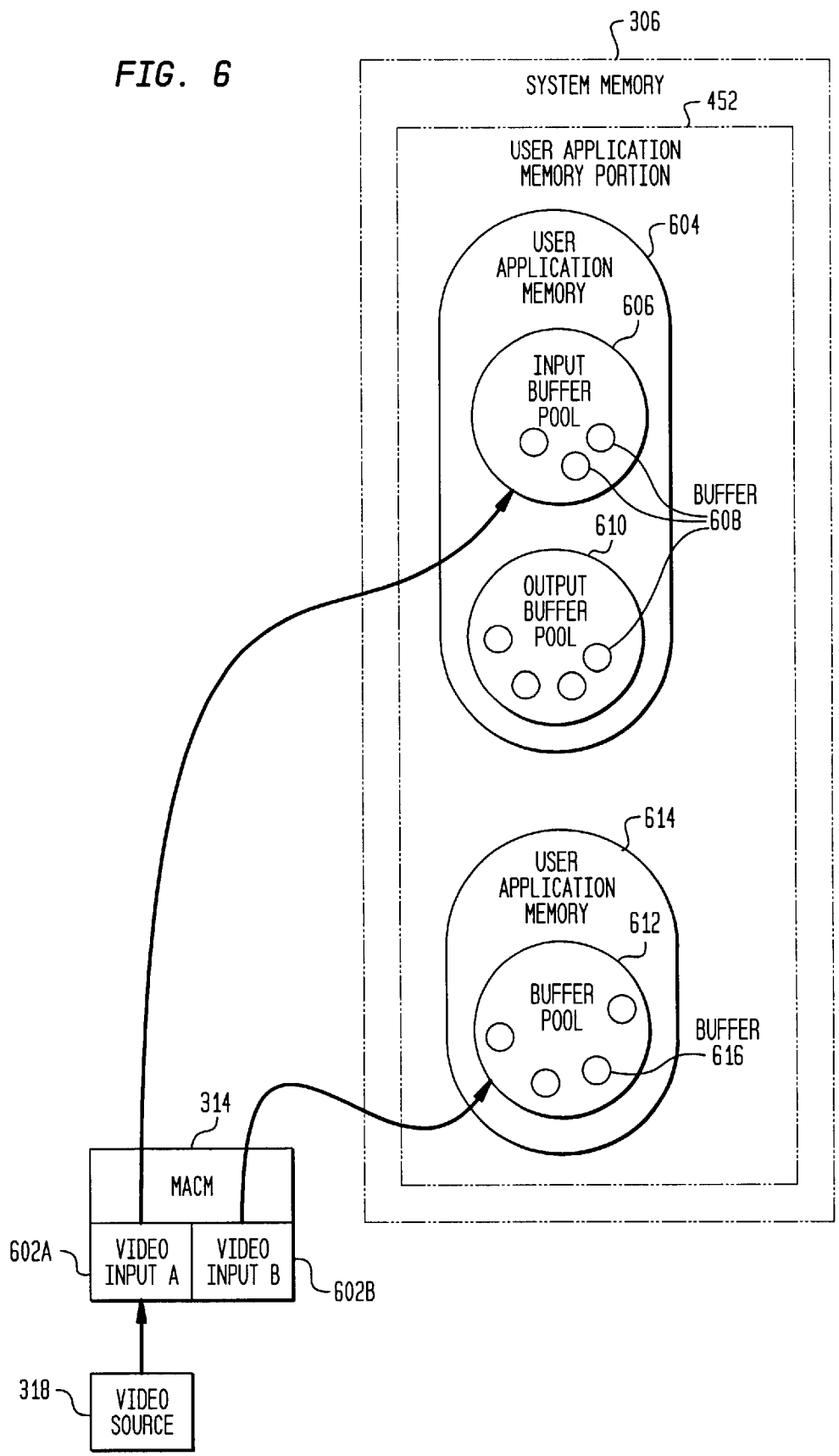
FIG. 6 illustrates the association of video inputs of the MACM to input buffer pools.

In step 506, the user application establishes its user application memory 604 in the user application memory portion 452 of the system memory 306 (see the example shown in FIG. 6). The user application memory 604 may have a plurality of buffer pools, such as buffer pools 606 and 610. These are called the input buffer pool 606 and the output buffer pool 610, respectively, for reference purposes. Each buffer pool 606 and 610 may include a plurality of DM buffers 608. The user application creates and allocates buffer pools and DM buffers within buffer pools by making calls to functions in the software libraries 1810. The functions, when executed, interact with the operating system 406, the CRIMM 308, and the system memory 306 to establish the user application memory 604 in the system memory 306, to create buffer pools 606, 610, and to allocate memory for buffers 608.

Some user applications may wish to receive video data from a video source 318, 320 connected to an input port of the MACM 314. According to the present invention, a user application which wants this capability must register a portion of its user application memory 604 (i.e., one of its buffer pools 606 or 610) with the MACM 314. More particularly, the user application must associate or link one of its buffer pools 606 or 610 with the input port of the MACM 314 into which the desired video signal is to be received.

For example, suppose that a user application wishes to receive the video signal from the video source 318 connected to video input A 602A of the MACM 314. If this is the case, then the user application associates its input buffer port 606 with video input A 602A of the MACM 314. Thereafter, the MACM 314 stores all video images received on video input A 602A in buffers in the input buffer port 606. The user application associates a buffer pool with a video input of the MACM 314 in step 508 by making calls to functions provided by the software libraries 1810. The functions, when executed, interact with the operating system 406, the MACM 314, and the system memory 306 to associate the user application's buffer pool with a video input of the MACM 314.

Preferably, the MACM 314 has multiple video inputs and multiple video outputs. In one embodiment, the MACM 314 has two video inputs and one video output In other embodiments, the MACM 314 has other than two video inputs and other than one video output. Accordingly, the MACM 314 is capable of receiving multiple video signals. Different user applications can associate their buffer pools with these video inputs (although preferably only one user application can be associated with each video input). Also, the same user application can associate its buffer pool(s) with multiple video inputs.

Figure 7:
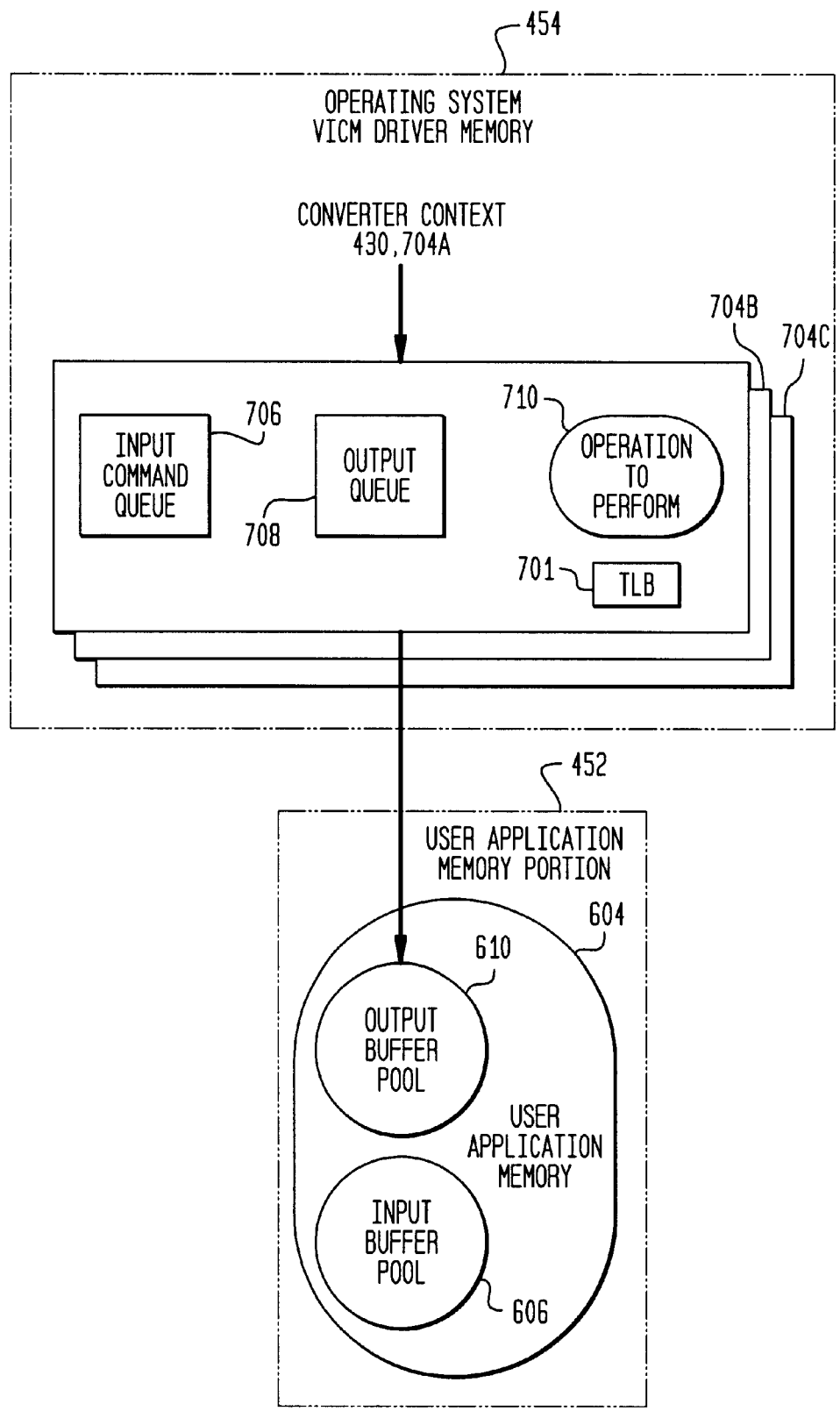
FIG. 7 is a block diagram of a converter context.

In step 510, the user application creates in the operating system VICM driver memory 454 a converter context 704 for each image conversion operation which it needs to perform (see the example in FIG. 7; converter contexts are also generally represented as 430 in FIG. 4B). Each converter context 704 is a logical representation of the VICM 326 established by the operating system 406 in combination with the VICM 326 (see FIG. 18). Each converter context 704 is capable of performing one of the imaging conversion functions from the set of functions supported by the VICM 326. This function is represented by "operation to perform 710" in FIG. 7.

In addition to the operation to perform 710, each converter context 704 includes an input command queue 706 and an output queue 708. When the user application wishes the converter context 704 to perform an operation, the user application makes a dmICSend call (which is part of the image conversion library 1820). The dmICSend call (or a message encompassing the dmICSend call) is placed in the input command queue 706 and processed on preferably a first-in first-out basis.

When the converter context 704 completes its processing of a dmICSend call, the converter context 704 places a message in the output queue 708 (the content of this message is described below). The user application retrieves this message from the output queue 708 by making a dmICReceive call (which is part of the image conversion library 1820).

Processing of flowchart 502 is complete after step 510 is performed, as indicated by step 512.

It will be useful at this point to further describe the VICM 326. As discussed above, the VICM 326 does not include a dedicated RAM memory. Instead, the VICM 326 uses the shared system memory 306. At any time, the portions of the system memory 306 that are being used by the VICM 326 are addressed by pointers stored in a physical TLB 327 (translation lookaside buffer) in the VICM 326.

Each converter context 704 includes a logical TLB 701. The logical TLB 701 stores the pointers to portions in system memory 306 that are accessible by the associated converter context 704. When a converter context 704 becomes active, the pointers in its logical TLB 701 are transferred to the physical TLB 327 by the operating system 406. Thus, it is possible to cycle through and use different areas of system memory 306 by changing the converter context.

Figure 8:
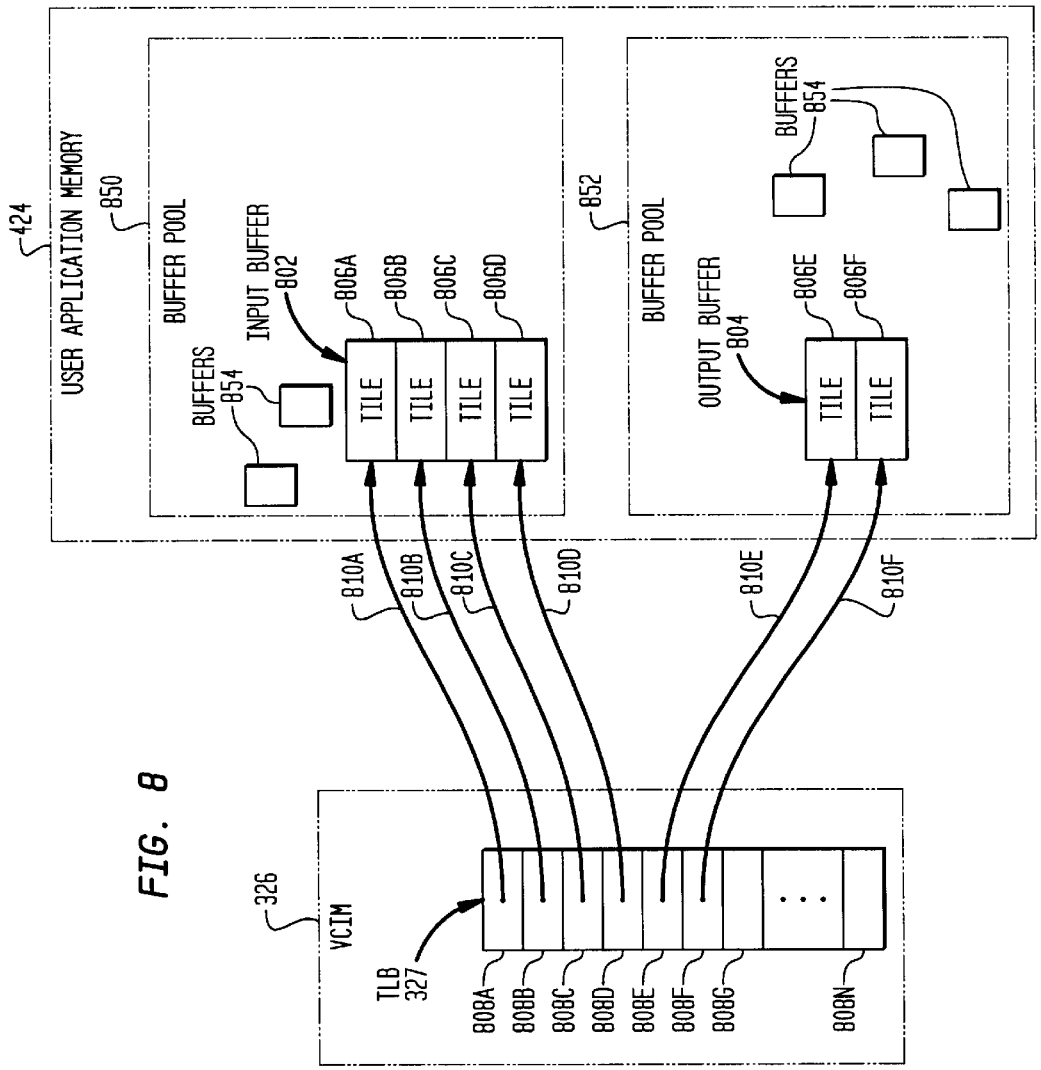
FIG. 8 illustrates the interaction of the TLB of the VICM and system memory tiles.

Referring to FIG. 8, the TLB 327 includes N entries, where N is preferably equal to 128 (although other values for N are possible). Each entry includes a pointer that addresses a tile in system memory 306. As noted above, each tile is preferably 64 Kbytes. Thus, the TLB 327 addresses up to 8 Mbytes of system memory 306. This 8 Mbyte portion of system memory 306 represents virtual local memory 1812 established by the operating system 406 for use by the VICM 326 (see FIG. 18) on a per converter context basis.

The TLB 327 is described in greater detail below.

Note in FIG. 8 that buffer pool 850 includes the input buffer 802 and other buffers 854. Similarly, buffer pool 852 includes the output buffer 804 and other buffers 854. A converter context may, in one instance, be processing the data in the input buffer 802. At the next instance, the converter context may be processing the data in one of the other buffers 854. Thus, it is possible to cycle through and use different areas of system memory 306 by accessing different DM buffers.

Operation of the Present Invention

The operation of the present invention shall now be described by describing various paths through the computer system 302. These paths are representative of the functionality and operation of the present invention. However, the invention is not limited to these paths. Additional functionality and operation of the present invention will be apparent to persons skilled in the relevant art(s) based on this discussion.

Scenario 1: Path from Video Source to Storage Device

Figure 9:
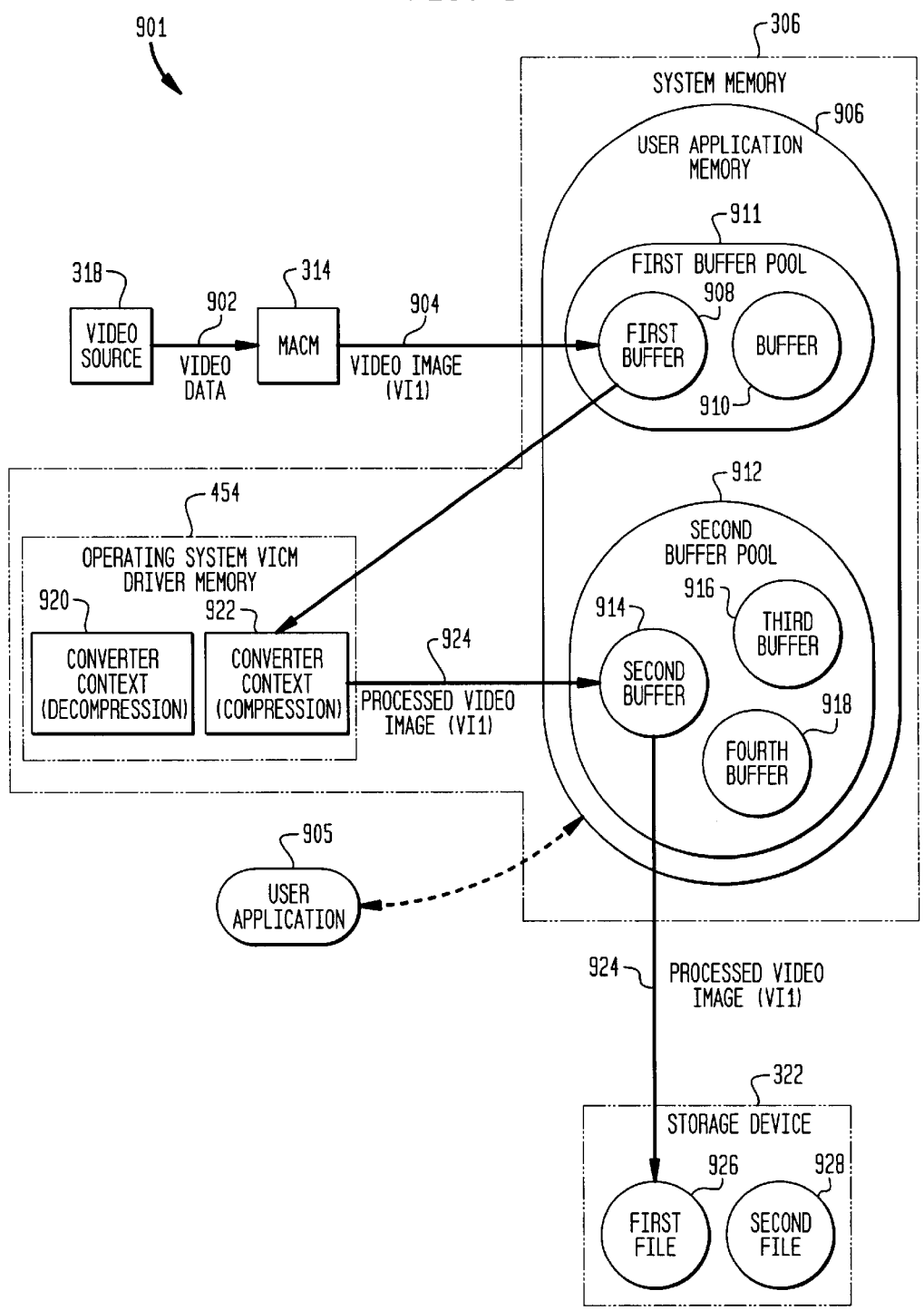
FIG. 9 shows a path from a video source to a storage device of the computer system shown in FIG. 3.
Figure 10:
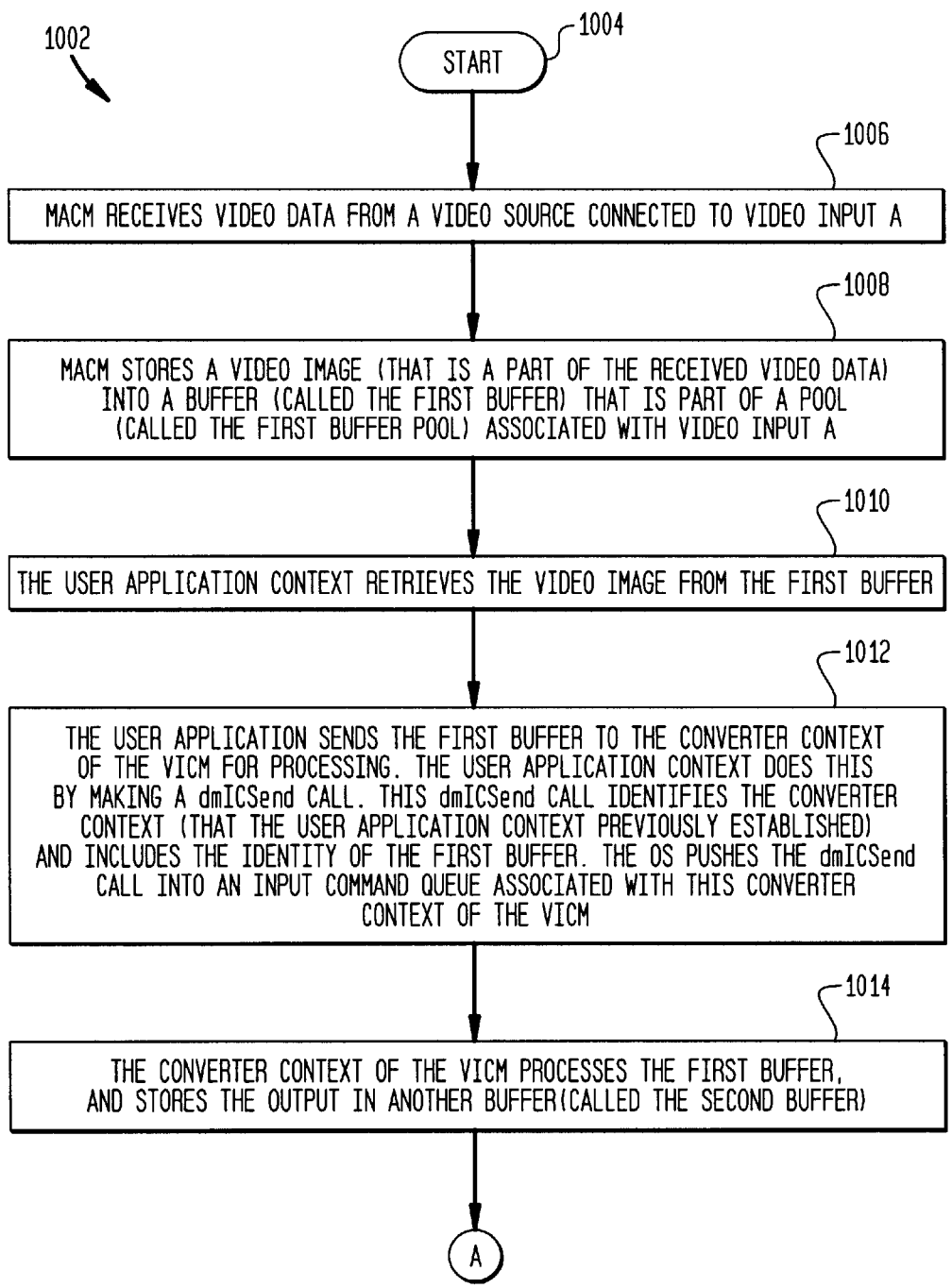

FIG. 9 illustrates a path from the video source 318 to the storage device 322. The operation of the invention while traversing this path is represented by a flowchart 1002 shown in FIGS. 10 and 11. Prior to the performance of flowchart 1002, assume that a user application 905 created a user application memory 906 having a first buffer pool 911 and a second buffer pool 912. The user application 905 also established a decompression converter context 920 and a compression converter context 922 in the operating system VICM driver memory 454. The user application 905 further associated the first buffer pool 911 with video input A of the MACM 314. Flowchart 1002 begins with step 1004, where control immediately passes to step 1006.

In step 1006, the MACM 314 receives video data 902 from the video source 318 that is connected to video input A.

In step 1008, the MACM 314 stores a video image 904 (that is a part of the received video data 902) into a buffer 908 (called the first buffer 908) that is part of the first buffer pool 911 that is linked to video input A.

Figure 12:
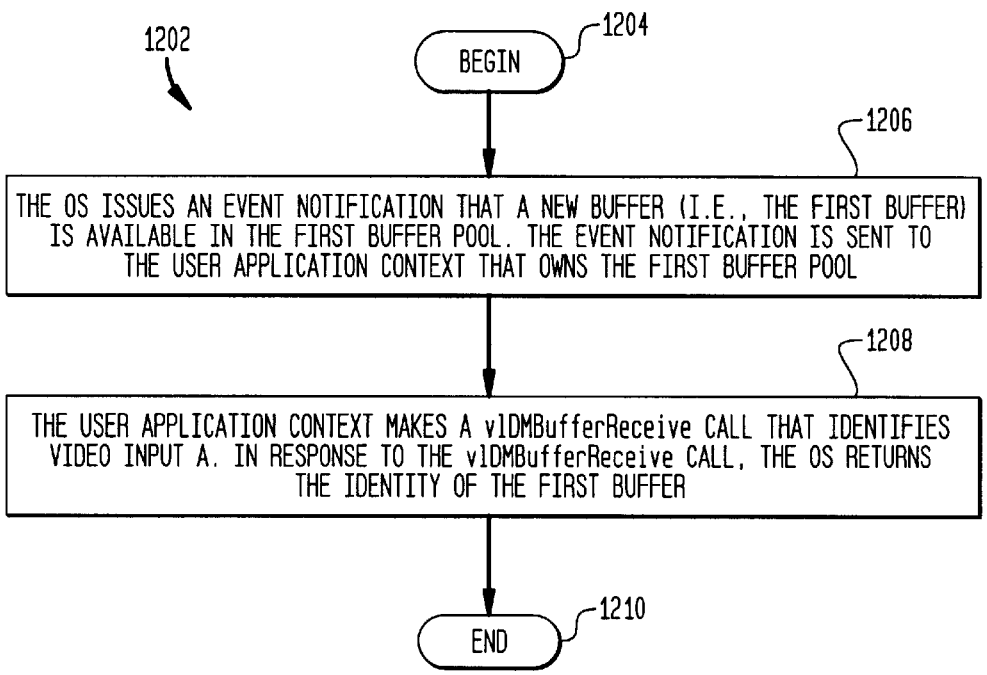

In step 1010, the user application 905 retrieves the video image 904 from the first buffer 908. The manner in which step 1010 is performed is represented by a flowchart 1202 shown in FIG. 12.

In step 1206, after the MACM 314 stores the video image 904 in the first buffer 908, the operating system 406 issues an event notification that a new buffer (i.e., the first buffer 908) is available in the first buffer pool 911. The event notification is sent to the user application 905 since it owns the first buffer pool 911. In step 1208, the user application 905 makes a vIDMBufferReceive call. This call is part of the video library 1822.

The vlDMBufferReceive call includes a passed parameter that identifies video input A. In response to the vlDMBufferReceive call, the operating system 406 returns the identity of the first buffer 908. This identity may be any means for identifying the first buffer 908, such as a label that has associated with it the addresses of system memory tiles in which the first buffer 908 is stored. The user application 905 is considered as having retrieved the first buffer 908 after it receives the identifier from the operating system 406.

Referring again to FIG. 10, in step 1012 the user application 905 sends the first buffer 908 to a converter context 920, 922 for processing. Assume that the user application 905 wishes to compress the video image 904 in the first buffer 908. In this case, the user application 905 sends the first buffer 908 to the compression converter context 922 for compression.

The user application 905 performs step 1012 by making a dmICSend call. This dmICSend call includes passed parameters that identify (1) the converter context 922, and (2) the identity of the first buffer 908. The operating system 406 pushes the dmICSend call (or a message that encapsulates the dmICSend call) into the input command queue 706 associated with this converter context 922.

As described below, this dmICSend call will result in the converter context 922 compressing the data in the first buffer 908. The user application 905 can also simultaneously send the first buffer 908 to other modules for processing. For example, the user application 905 could also send the first buffer 908 to the CRIMM 308 for display of the graphics data on the graphics monitor 312 (this is described below). The user application 905 could also send the first buffer 908 to another converter context of the VICM 326 for other types of image conversion processing.

The user application 905 could also have the CRIMM 308 perform graphics rendering operations on the data in the first buffer 908. Such operations involve blue screen, computer generated animations, overlays, 2D or 3D objects, text, titles, and any other well known graphical rendering operations. Thus, according to the present invention, user applications can direct and control the performance of graphical rendering operations on real-time video data.

The operations described above could occur simultaneously, or in any order. Such potential operation illustrates the flexibility and power that results when user applications are given the ability to participate in and control/direct/manipulate processing that was previously reserved to the hardware and/or operating system. This aspect of the present invention is further described below.

In step 1014, the converter context 922 processes the first buffer 908, and stores the output in another buffer 914 (called the second buffer 914). The manner in which step 1014 is performed is represented by a flowchart 1302 shown in FIG. 13.

In step 1306, at the appropriate time (preferably on a first-in first-out basis), the operating system 406 pops the dmICSend call from the input command queue 706 of the converter context 922. Then, the operating system 406 populates the VICM's TLB 327 with addresses (called input addresses) of system memory tiles in which the first buffer 908 is stored. The operating system also populates the VICM's TLB 327 with addresses (call output addresses) of system memory tiles representing the second buffer 914 in which the output of the converter context 922 is to be stored. (The operating system 406 may populate the logical TLB 701 first, and then transfer the contents of the logical TLB 701 to the physical TLB 327 when the converter context becomes active.)

The manner in which the operating system 406 populates the TLB 327 is represented by a flowchart 1402 contained in FIG. 14. In step 1406, the operating system 406 reads the identity of the first buffer 908 (i.e., the input buffer) from the dmICSend call. The operating system 406 translates this buffer identity to addresses (called input addresses) of tiles in which the first buffer 908 is stored. In one embodiment, the operating system 406 maintains a table that cross references buffer identities to system memory tiles in which the associated buffers are stored. The operating system 406 stores these input addresses in entries (called input entries) of the TLB 327. The operating system 406 also informs the VICM 326 that the input buffer 908 (i.e., the first buffer 908) for processing the dmICSend call is in the tiles referenced by the input addresses stored in these TLB input entries.

In step 1408, the operating system 406 determines whether the converter context 922 is configured to have its output stored in an output buffer identified in dmICSend call, or in an output buffer pool associated with converter context 922. Previously, as part of creation of the converter context 922, the user application 905 elected (1) to store output from the converter context 922 in an output buffer identified in each dmICSend call; or (2) to store output from the converter context 922 in an output buffer pool associated with converter context 922. (The user application 905 made this election during step 510 of FIG. 5).

If the user application 905 elected to have output stored in an output buffer identified in each dmICSend call, then prior to making the dmICSend call the user application 905 allocated a new, empty buffer, and then passed the identity of this buffer as a passed parameter in the dmICSend call. If, instead, the user application 905 elected to have output stored in an output buffer pool associated with converter context 922, then prior to making the dmICSend call the user application 905 created this buffer pool and identified it to the converter context 922.

FIG. 7 illustrates an example where the user application 905 has elected to have converter context output stored in an output buffer pool 610 associated with converter context 704A. In an alternate embodiment, output from the converter context 704A is stored in the output buffer pool 610 only if an output buffer is not specified in the dmICSend call.

If it is determined in step 1408 that the converter context 922 is configured to have its output stored in an output buffer identified in the dmICSend call, then step 1410 is performed. Otherwise, step 1412 is performed.

In step 1410, the operating system 406 reads the identity of the output buffer (i.e., the second buffer 914) from the dmICSend call. The operating system 406 translates this buffer identity to addresses (called output addresses) of memory system tiles in which the second buffer 914 is stored. The operating system 406 stores these output addresses in entries (called output entries) of the TLB 327. The operating system 406 also informs the VICM 326 that the output buffer 914 (i.e., the second buffer 914) for storing the output of the converter context 922 is in the tiles referenced by the output addresses stored in these TLB output entries.

Referring again to step 1408, if it is determined that the converter context 922 is configured to have its output stored in an output buffer pool associated with the converter context 922, then step 1412 is performed. In step 1412, the operating system 406 allocates a new, empty buffer (i.e., the second buffer 914) in the output buffer pool associated with converter context 922. The identity of the second buffer 914 is returned to the operating system 406. Assume that this output buffer pool is the second buffer pool 912. The operating system 406 translates the identity of the second buffer 914 to addresses (called output addresses) of tiles in which the second buffer 914 is stored. The operating system 406 stores these output addresses in entries (called output entries) of the TLB 327. The operating system 406 also informs the VICM 326 that the output buffer 914 (i.e., the second buffer 914) for storing the output of the converter context 922 is in the tiles referenced by the output addresses stored in these TLB output entries.

Referring again to FIG. 13, in step 1308 the converter context 922 processes the first buffer 908 (the first buffer 908 is accessed by reference to the input addresses in the TLB 327). In particular, the converter context 922 performs its defined operation 710 (compression) on the data in the first buffer 908. The converter context 922 stores the output of such processing in the second buffer 914 (accessed by reference to the output addresses in the TLB 327).

In step 1310, after it finishes processing the first buffer 908 and storing the output in the second buffer 914, the converter context 922 stores a message in the converter context 922's output queue 708. This message includes the identity of the second buffer 914 (i.e., the place where the output was stored). The operating system 406 issues an event notification that new information is available in the converter context 922's output queue 708. This event notification is sent to the user application 905 since it originally created the converter context 922.

Figure 11:
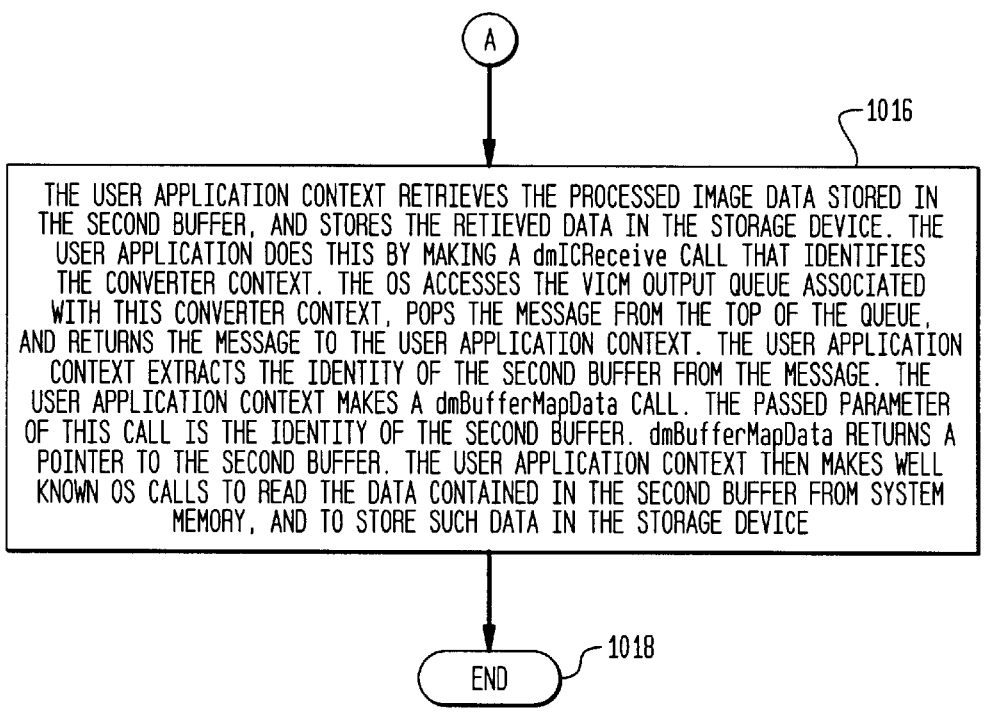

Referring again to the flowchart 1002 in FIG. 11, in step 1016 the user application 905 retrieves the processed image data 924 stored in the second buffer 914, and stores the retrieved data in a first file 926 in the storage device 322. The user application 905 does this by making a dmICReceive call.

The dmICReceive call, which is part of the image conversion library 1820, includes a passed parameter that identifies the converter context 922. The operating system accesses the converter context output queue 708 associated with this converter context 922, pops the message from the top of the output queue 708, and returns the message to the user application 905.

The user application 905 extracts the identity of the second buffer 914 from the message. The user application 905 makes a dmBufferMapData call, which is part of the operating system DM buffer facility 1890. The passed parameter of this call is the identity of the second buffer 914. dmBufferMapData returns a pointer to the second buffer 914.

The user application 905 then makes well known operating system calls to read the data contained in the second buffer 914 from system memory 306, and to store such data in the first file 926 of the storage device 322. Operation of flowchart 1002 is complete after step 1016 is performed, as indicated by step 1018.

Scenario 2: Path from Storage Device to Graphics Monitor

FIG. 15 illustrates a path from the storage device 322 to the graphics monitor 312. The operation of the invention while traversing this path is represented by a flowchart 1602 shown in FIG. 16. Prior to the performance of flowchart 1602, assume that the user application 905 created in its user application memory 906 a first buffer pool 911 and a second buffer pool 912. The user application 905 also established a decompression converter context 920 and a compression converter context 922. Flowchart 1602 begins with step 1604, where control immediately passes to step 1606.

In step 1606, the user application 905 retrieves a compressed video image 1502 from a second file 928 in the storage device 322 using normal and well known operating system calls. The user application 905 creates a new, empty buffer (called the third buffer 916) by making a dmBufferAllocate call, which returns the identity of the third buffer 916. The dmBufferAllocate call is part of the DM buffer operating system facility 1890.

The user application 905 makes a dmBufferMapData call, which is also part of the DM buffer operating system facility 1890. The passed parameter of this call is the identity of the third buffer 916. dmBufferMapData returns a pointer to the third buffer 916. The user application 905 then makes well known operating system calls to store the data 1502 retrieved from the storage device 322 in the third buffer 916.

In step 1608, the user application 905 sends the third buffer 916 to the decompression converter context 920 of the VICM 326 for processing. The user application 905 does this by making a dmICSend call. This dmICSend call has passed parameters that identify the decompression converter context 920 and the identity of the third buffer 916. The operating system 406 pushes the dmICSend call into the input command queue 706 associated with this converter context 920.

In step 1610, the converter context 920 decompresses the compressed image 1502 in the third buffer 916. The converter context 920 stores the result in a fourth buffer 918. Note that the third buffer 916 (the input buffer) and the fourth buffer 918 (the output buffer) are in the same buffer pool 912. In the scenario described previously, the two were in different buffer pools 911, 912. This is another example of the flexibility of the invention.

Figure 17:
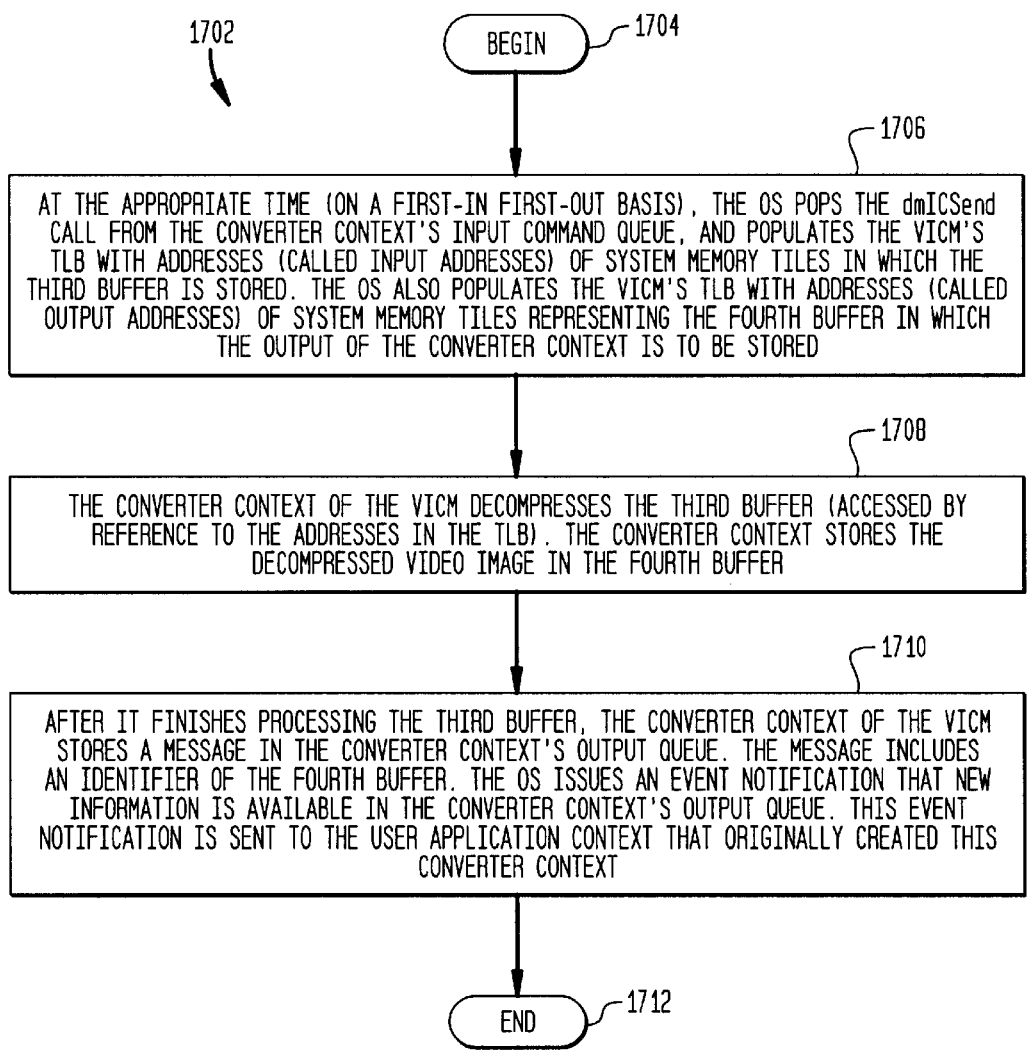

The manner in which step 1610 is performed is represented by a flowchart 1327 in FIG. 17. In step 1706, at the appropriate time (preferably on a first-in first-out basis), the operating system 406 pops the dmICSend call from the converter context 920's input command queue 706, and populates the VICM 326's TLB 327 with addresses (called input addresses) of system memory tiles in which the third buffer 916 is stored. The operating system 406 also populates the TLB 327 with addresses (called output addresses) of system memory tiles representing the fourth buffer 918 in which the output of the converter context 920 is to be stored. The manner in which the TLB 327 is populated is described above.

In step 1708, the converter context 920 decompresses the compressed data 1502 in the third buffer 916 (accessed by reference to the addresses in the TLB). The converter context 920 stores the decompressed video image 1504 in the fourth buffer 918 (accessed by reference to the addresses in the TLB).

In step 1710, after it finishes processing the third buffer 916 and storing the output in the fourth buffer 918, the converter context 920 stores a message in the converter context 920's output queue 708. The message includes an identifier of the fourth buffer 918. The operating system 406 issues an event notification that new information is available in the converter context 920's output queue 708. This event notification is sent to the user application 905 since it originally created the converter context 920.

Referring again to FIG. 16, in step 1612 the user application 905 retrieves the information from the fourth buffer 918, and displays the information on the graphics monitor 312. The user application 905 does this by first making a dmICReceive call (that is part of the image conversion library 1820) that includes a passed parameter that identifies the converter context 920. In response to the dmICReceive call, the operating system 406 accesses the converter context 920's output queue 708, pops the message from the top of the output queue 708, and returns the message to the user application 905.

The user application 905 extracts the identity of the fourth buffer 918 from the message. The user application 905 makes a dmBufferMapData call. The passed parameter of this call is the identity of the fourth buffer 918. dmBufferMapData returns a pointer to the fourth buffer 918.

The user application 905 then makes a glDrawPixels call. The passed parameter of this call is the pointer to the fourth buffer 308. In response to the glDrawPixels call, the graphics renderer in the CRIMM 308 performs any necessary well known processing on the data in the fourth buffer 918, and stores the processed data in the frame buffer 1590 formed in system memory 306. The GBEM 310 displays the contents of the frame buffer 1590 on the graphics display 312.

The operation of flowchart 1602 is complete after step 1612 is performed, as indicated by step 1614.

Scenario 3: Path from Storage Device to Video OutputSink

FIG. 15 shall be used again to describe a path from the storage device 322 to a video output/sink 316 (assume that the steps of flowchart 1602 in FIG. 16 were not performed). Previously, preferably during initialization, the user application 905 created a device context of the video output. The video output device context is a logical representation of the video output. In one embodiment, multiple user applications may work with the same video output via their respective video output device contexts. In another embodiment, video outputs are not simultaneously shared by user applications.

Figure 19:
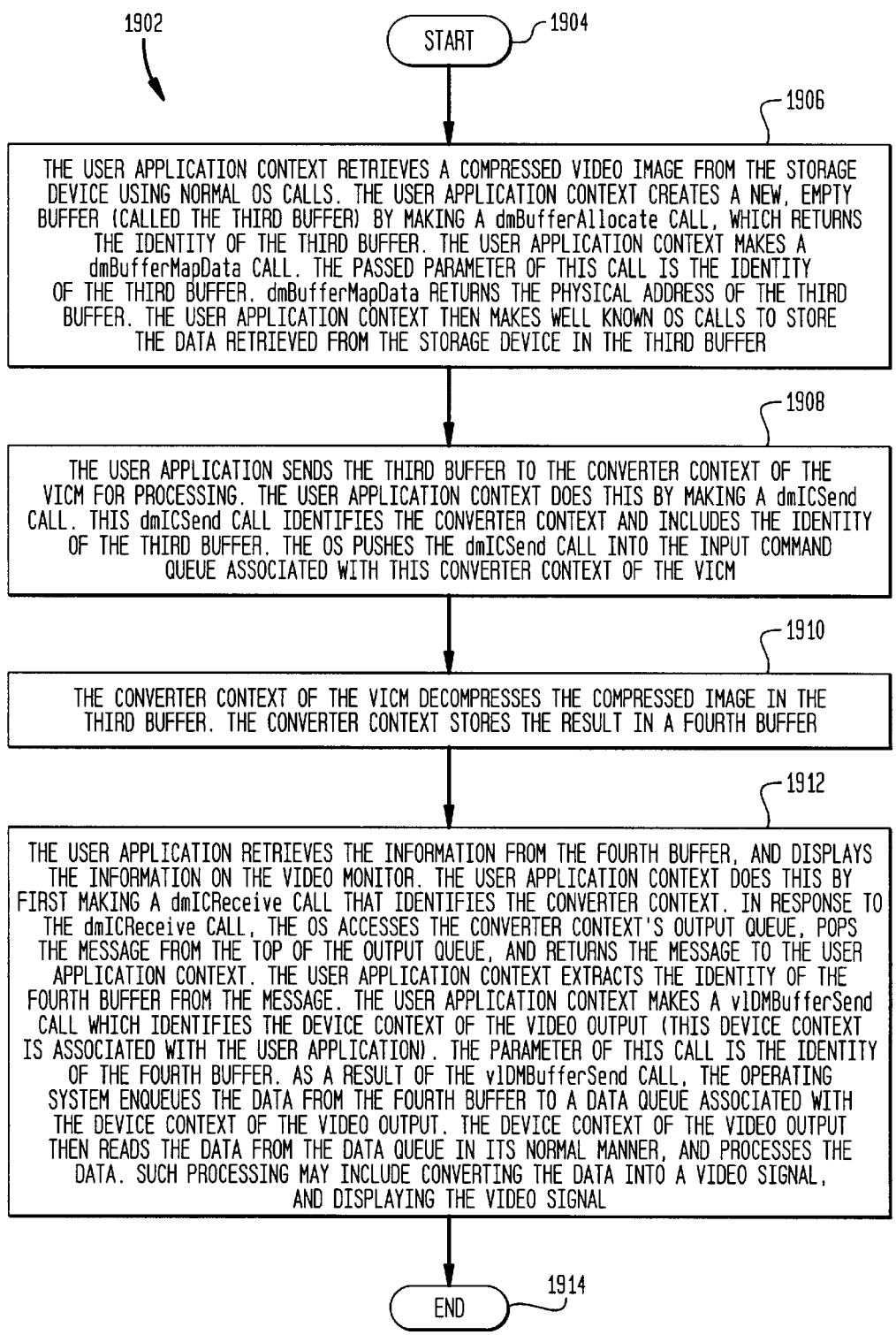

The operation of the invention while traversing the path of the third scenario is represented by a flowchart 1902 shown in FIG. 19. Flowchart 1902 begins with step 1904, where control immediately passes to step 1906.

In step 1906, the user application 905 retrieves a compressed video image 1502 from the second file 928 in the storage device 322 using normal and well known operating system calls. The user application 905 creates a new, empty buffer (called the third buffer 916) by making a dmBufferAllocate call, which returns the identity of the third buffer 916. The dmBufferAllocate call is part of the DM buffer operating system facility 1890.

The user application 905 makes a dmBufferMapData call, which is also part of the DM buffer operating system facility 1890. The passed parameter of this call is the identity of the third buffer 916. dmBufferMapData returns a pointer to the third buffer 916. The user application 905 then makes well known operating system calls to store the data 1502 retrieved from the storage device 322 in the third buffer 916.

In step 1908, the user application 905 sends the third buffer 916 to the decompression converter context 920 of the VICM 326 for processing. The user application 905 does this by making a dmICSend call. This dmICSend call has passed parameters that identify the decompression converter context 920 and the identity of the third buffer 916. The operating system 406 pushes the dmICSend call into the input command queue 706 associated with this converter context 920.

In step 1910, the converter context 920 decompresses the compressed image 1502 in the third buffer 916. The converter context 920 stores the result in a fourth buffer 918.

In step 1912, the user application 905 retrieves the information from the fourth buffer 918, and passes the information to the video output (not shown in FIG. 15). The user application 905 does this by first making a dmICReceive call (that is part of the image conversion library 1820) that includes a passed parameter that identifies the converter context 920. In response to the dmICReceive call, the operating system 406 accesses the converter context 920's output queue 708, pops the message from the top of the output queue 708, and returns the message to the user application 905. The user application 905 extracts the identity of the fourth buffer 918 from the message.

Then, the user application 905 makes a vIDMBufferSend call which identifies the device context of the video output associated with the user application 905. The parameter of this call is the identity of the fourth buffer. As a result of the vIDMBufferSend call, the operating system 406 enqueues the data from the fourth buffer to a data queue (not shown) associated with the device context of the video output The device context of the video output then reads the data from the data queue in its normal manner, and processes the data. Such processing may include converting the data into a video signal, and displaying the video signal.

The operation of flowchart 1902 is complete after step 1912 is performed, as indicated by step 1914.

Note that the MACM 314 can receive video signals of any type, and store image data from those video signals in DM buffers in system memory 306. User applications can be programmed to process any type of video signals. The converter contexts of the VICM 326 can process any type of video signals. For example, a compression converter context can compress whatever data is in a buffer, irrespective of the video type that is represented by such data Thus, the present invention is very flexible because it can process any video type.

Graphics Rendering Using the CRIMM

Thus far, the discussion has focused primarily on operations and scenarios involving the VICM 326. In the following, the operation of the CRIMM 308 is discussed. In particular, graphics rendering operations involving the CRIMM 308 are discussed.

Referring to FIG. 3, the CRIMM 308 is directly connected to the system memory 306. This is consistent with the memory-centric approach of the present invention, where all primary components of the computer system 302 are directly connected to and/or have direct access to the system memory 306. Applications and advantages of the memory-centric approach of the present invention are described below.

Figure 20:
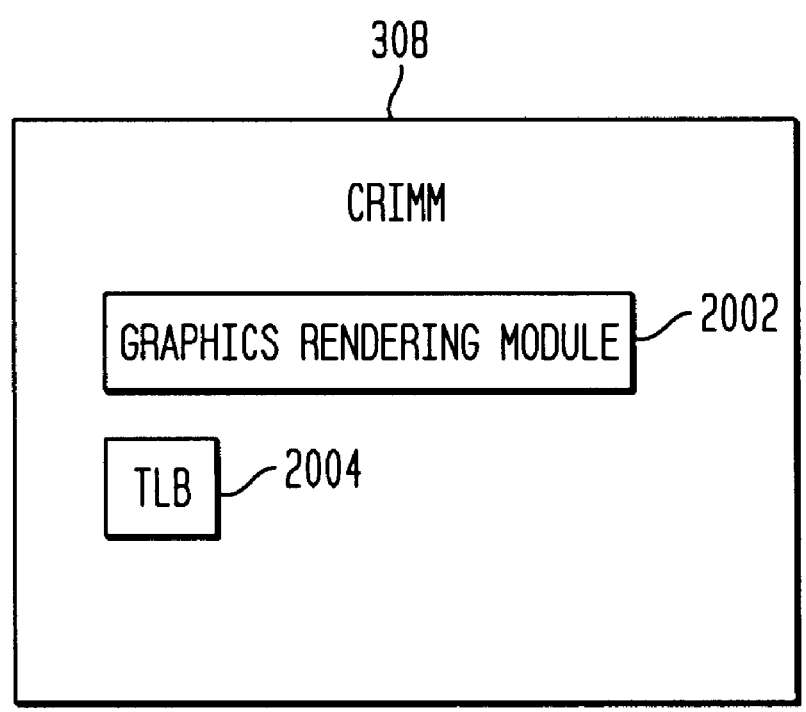
FIG. 20 is a block diagram of the CRIMM.

FIG. 20 illustrates a block diagram of the CRIMM 308. The CRIMM 308 includes a graphics rendering module 2002, which performs graphics rendering operations. Preferably, the graphics rendering module 2002 is compatible with OpenGL, although the present invention is not limited to this embodiment Instead, the present invention is adapted and intended to work with non-OpenGL systems, such as (but not limited to) QUICKDRAW 3D, DIRECT 3D, X WINDOWS, etc.

The CRIMM 308 also includes a physical TLB 2004 (translation lookaside buffer), which is similar to the TLB 327 in the VICM 326. The TLB 2004 stores addresses to tiles in system memory 306. These tiles correspond to one or more DM buffers. The CRIMM 308 stores its output (that it generates in accordance with commands that it receives) in these DM buffers. The CRIMM 308 accesses these DM buffers via the tile addresses stored in the TLB 2004.

Graphics Rendering Concepts

Before describing the invention further, it will be useful to describe a few relevant graphics rendering concepts according to the present invention.

A graphics context defines the graphical configuration, characteristics, and/or capabilities of a drawable (described below) to which rendering operations are to be directed. A graphics context includes a set of graphical state variables. These state variables define the graphical configuration, characteristics, and/or capabilities of a drawable. For example, these state variables define whether RGB (red, green, blue) rendering is to be performed, whether single or double buffering is being used, whether there is depth or no depth, whether there is alpha or no alpha, etc. An application may be associated with a number of graphics contexts. At any time, however, there is only one current or active graphics context.

In an embodiment of the invention, a new graphics context is created by first creating an instance of FB (frame buffer) config, which is a data structure, and which is an abstract representation of a graphics context FB config has parameters that are used to specify values for graphical characteristics and capabilities. For example, FB config has parameters that define whether RGB rendering is to be performed, whether single or double buffering is being used, whether there is depth or no depth, whether there is alpha or no alpha, etc.

An instance of FB config is created by calling a glxChoseFBConfigSGIX function, that is part of the software libraries 1810 (FIG. 18). This function returns an identifier (such as, but not limited to, a pointer) to the newly created FB config instance.

The software libraries 1810 also include a function called glxCreateContextWithFBConfigSGIX. This function is called to create a new graphics context. The identifier of a FB config instance is passed to this function. This function creates a new graphics context having the characteristics and capabilities specified by the FB config instance, and returns an identifier of the newly created graphics context.

A drawable is an object to which rendering operations are directed. For example, the CRIMM 308 renders into drawables. A drawable can be a window, a pixel buffer (Pbuffer), or any other structure or object to which graphical rendering can be performed. Pbuffers are described below. An application may be associated with a number of drawables. At any time, however, there is only one current or active drawable. The current drawable is associated with the current graphics context. This current graphics context, as described above, defines the graphical configuration or characteristics of the current drawable. For example, the current graphics context may specify that RGB rendering is to be performed on the current drawable, double buffering is to be used with the current drawable, etc. The graphical characteristics of the current drawable can be changed by making a different graphics context active.

Figure 26:
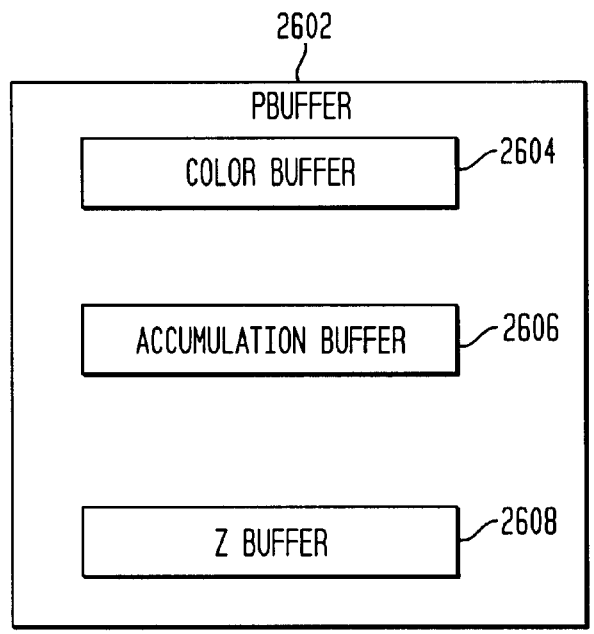
FIG. 26 is a block diagram of a Pbuffer.

A Pbuffer is a drawable. Thus, a Pbuffer is an object to which rendering operations are directed. Referring to FIG. 26, a Pbuffer 2602 includes a color buffer 2604, an accumulation buffer 2606, and a Z buffer 2608. The color image being rendered is stored in the color buffer 2604. Depth information is stored in the Z buffer 2608. The accumulation buffer 2606 is used to accumulate images that are drawn into the color buffer 2604.

Pbuffers are typically used in the context of OpenGL. In fact, the embodiment of the invention described herein operates with OpenGL. It should be understood, however, that the present invention is not limited to this embodiment. The present invention, including DM Pbuffers (described below), is adapted and intended to work with non-OpenGL systems, such as (but not limited to) QUICKDRAW 3D, DIRECT 3D, X WINDOWS, etc.

In some previous systems, Pbuffers 2602 are stored in graphics memory 109. As described above, in the conventional computer system 102 (FIG. 1), user applications do not have access to graphics memory 109. Thus, a Pbuffer 2602 must be copied from graphics memory 109 to system memory 106 in order to allow a user application to access and manipulate data in the Pbuffer 2602. The Pbuffer 2602 must be copied back to the graphics memory 109 in order to display the Pbuffer 2602 on the graphics monitor 114. Thus, the conventional computer system 102 is limited because it requires a significant about of copying in order to enable a user application to access and manipulate the data in a Pbuffer 2602.

The conventional computer system 102 is limited for an additional reason. The number of Pbuffers 2602 that can be created is limited by the size of the graphics memory 109, which is typically smaller than the size of the system memory 106. Thus, in the conventional computer system 102, it may not be possible to perform a certain series of graphics operations because there is not enough room in the graphics memory 109 to store all of the needed Pbuffers 2602. This is the case, even though there may be an abundance of free space in the system memory 106.

Figure 27:
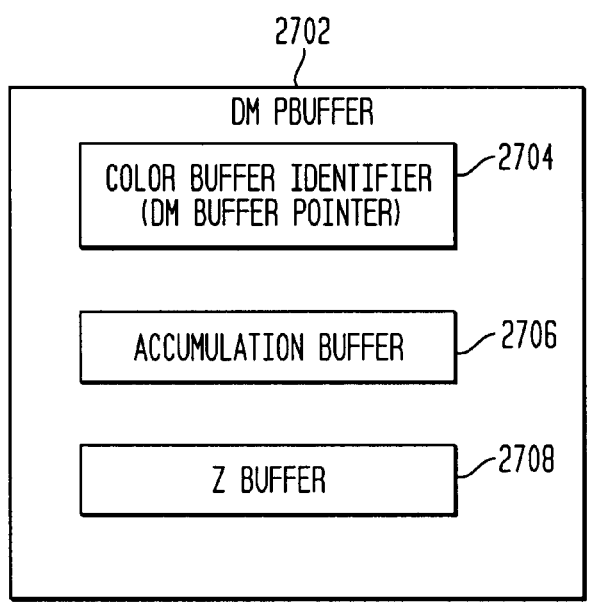
FIG. 27 is a block diagram of a DM Pbuffer.

The present invention solves these problems by introducing a new type of Pbuffer, called a DM (digital media) Pbuffer 2702 (see FIG. 27). Like the Pbuffer 2602 shown in FIG. 26, the DM Pbuffer 2702 has an accumulation buffer 2606 and a Z buffer 2608. The DM Pbuffer 2702 of the present invention, however, has a color buffer identifier 2704, instead of a color buffer 2604. The color buffer identifier 2704 is a pointer to a DM buffer. More particularly, the color buffer identifier 2704 is preferably a storage location having stored therein an identifier (such as a pointer) to a DM buffer. The image that is being rendered is stored in this DM buffer, as opposed to being stored in the DM Pbuffer 2702 itself The DM Pbuffer is said to be associated with the DM buffer identified by the color buffer identifier 2704.

An DM Pbuffer can be (and typically is) associated with different DM buffers over time. This is done by changing the value of the color buffer identifier 2704 in the DM Pbuffer to address different DM buffers.

In an alternate embodiment, the color buffer identifier 2704 points to a plurality of DM buffers.

The DM Pbuffer 2702 is stored in system memory 306. As described above, DM buffers are stored in system memory 306, which is directly accessible to all components coupled to system memory 306, such as the CPU 304, the CRIMM 308, the GBEM 310, the MACM 314, and the VICM 326. Accordingly, in the present invention, a user application (executing in the CPU 304) can access the image being rendered by accessing the appropriate DM buffer (that is linked to the appropriate DM Pbuffer). It is not necessary to copy data from one memory unit to another in order to achieve this functionality. The same is true for access to graphical data by the CRIMM 308, the GBEM 310, the MACM 314, and the VICM 326.

In operation, graphical operations are directed to a DM Pbuffer 2702. However, the CRIMM 308 does not attempt to perform those graphical operations on color image data stored in the DM Pbuffer 2702 itself. Instead, the CRIMM 308 performs the graphical operations on data in a DM buffer that is linked to (i.e., associated with) the DM Pbuffer 2702. As described above, a DM Pbuffer is associated with a DM buffer via the color buffer identifier 2704 in the DM Pbuffer. The DM Pbuffer 2702 is said to be aliased as the DM buffer which is identified by the color buffer identifier 2704.

A new DM Pbuffer 2702 is created by calling a function called glxCreateGLXPbufferSGIX, that is part of the software libraries 1810 (FIG. 18). The function may receive as input a constant parameter called DM_PBUFFER. If DM_PBUFFER is passed, then the function creates a DM Pbuffer 2702. Otherwise, the function creates a Pbuffer 2602. The function returns an identifier to the newly created Pbuffer 2602 or DM Pbuffer 2702.

A newly created DM Pbuffer 2702 has a color buffer identifier 2704 (FIG. 27), but this color buffer identifier 2704 does not initially store an address to a DM buffer. It is necessary to called a function called glxDMBufferAssociate (that is part of the software libraries 1810), also called glXAssociateDMPbuffer in some implementations, to do this. This function receives as passed parameters an identifier of a DM Pbuffer 2702, and an identifier of a DM buffer. The function stores the identifier of the DM buffer into the color buffer identifier field 2704 of the DM Pbuffer 2702 (that is identified by the passed parameter).

At any time, only one drawable and one graphics context are current or active. A function called glxMakeCurrent is called to select the current drawable and the current graphics context. This function, which is part of the software libraries 1810, receives as passed parameters an identifier of a drawable (such as a DM Pbuffer 2702), and an identifier of a graphics context. This drawable and graphics context are made current by the function.

Figure 21:
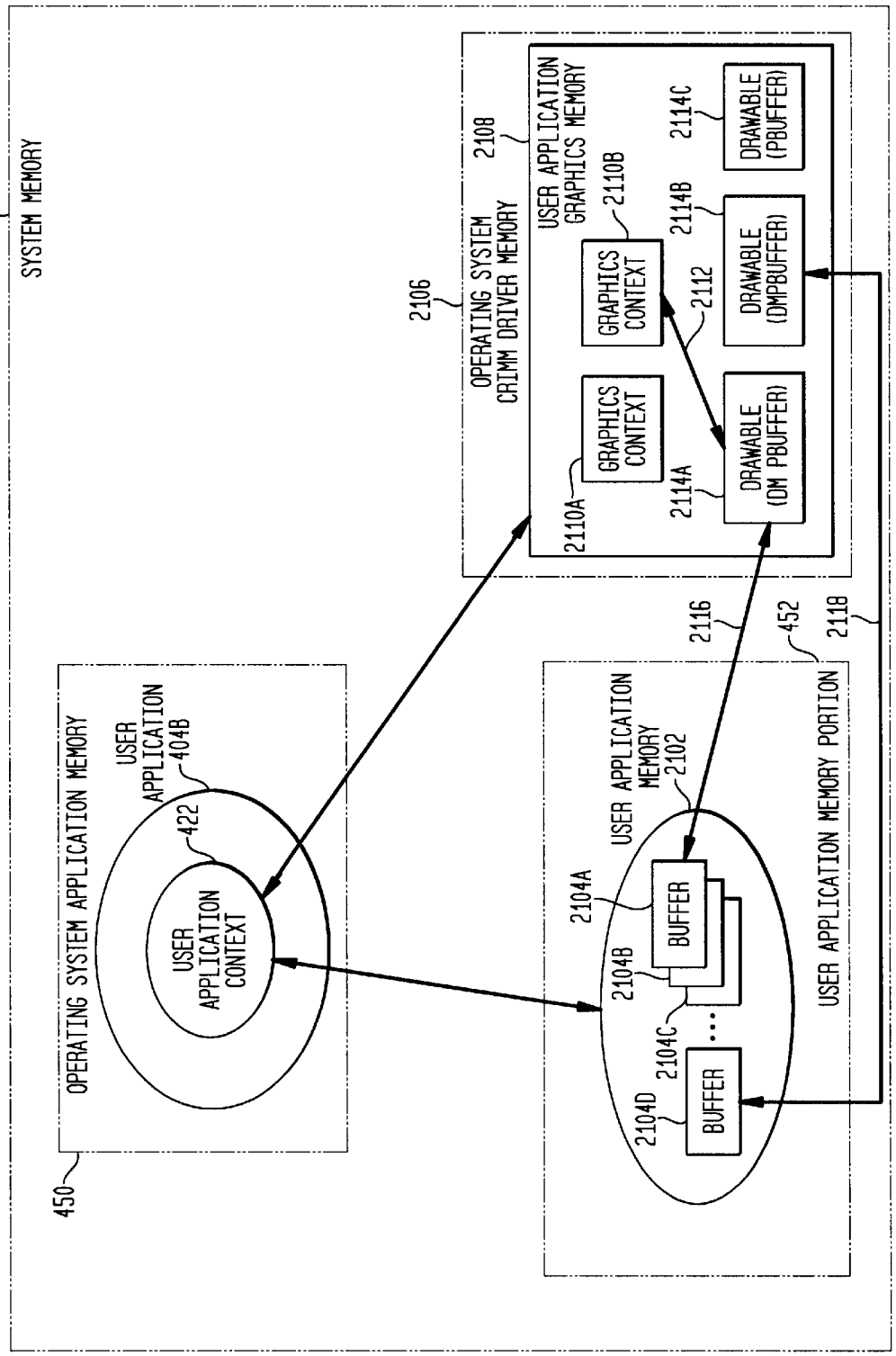
FIG. 21 illustrates the interaction between a user application context, user application memory, and the operating system CRIMM driver memory.

Referring to FIG. 21, each user application context 422 is associated with a user application memory 2102. The user application memory 2102 is part of a user application memory portion 452, which is part of the system memory 306. The user application memory 2102 includes a plurality of DM buffers 2104.

The user application context 422 is also associated with a user application graphics memory 2108, which is part of an operating system CRIMM driver memory 2106. The operating system CRIMM driver memory 2106 is part of the system memory 306. The user application graphics memory 2108 stores a plurality of graphics contexts 2110 that the user application context created 422 by calling the glxChoseFBConfigSGIX and glxCreateContextWithFBConfigSGIX functions. The user application graphics memory 2108 also stores a number of drawables 2114, which the user application context 422 created by calling the glxCreateGLXPbufferSGIX function. Drawables 2114A and 2114B are DM Pbuffers, and they are respectively aliased as DM buffer 2104A and 2104D by use of the glxDMBufferAssociate (also called glXAssociateDMPbuffer) function. Drawable 2114C is a Pbuffer. Graphics context 2110B and drawable 2114A have been made current by appropriately calling the glxMakeCurrent function (as indicated by line 2112).

Scenario 4: Rendering Using the CRIMM

Figure 22:
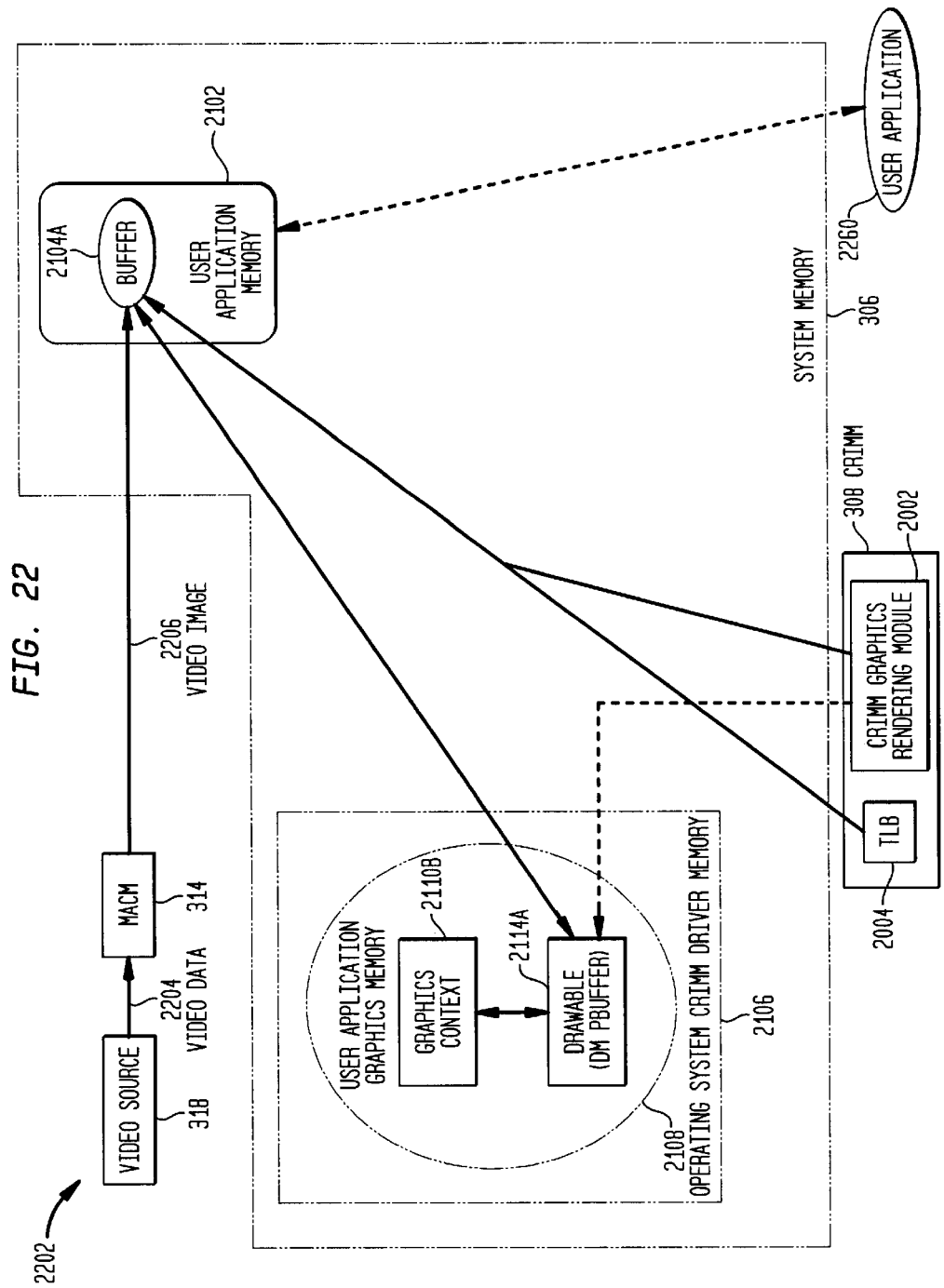
FIG. 22 illustrates a scenario where the CRIMM renders to a DM Pbuffer.
Figure 23:
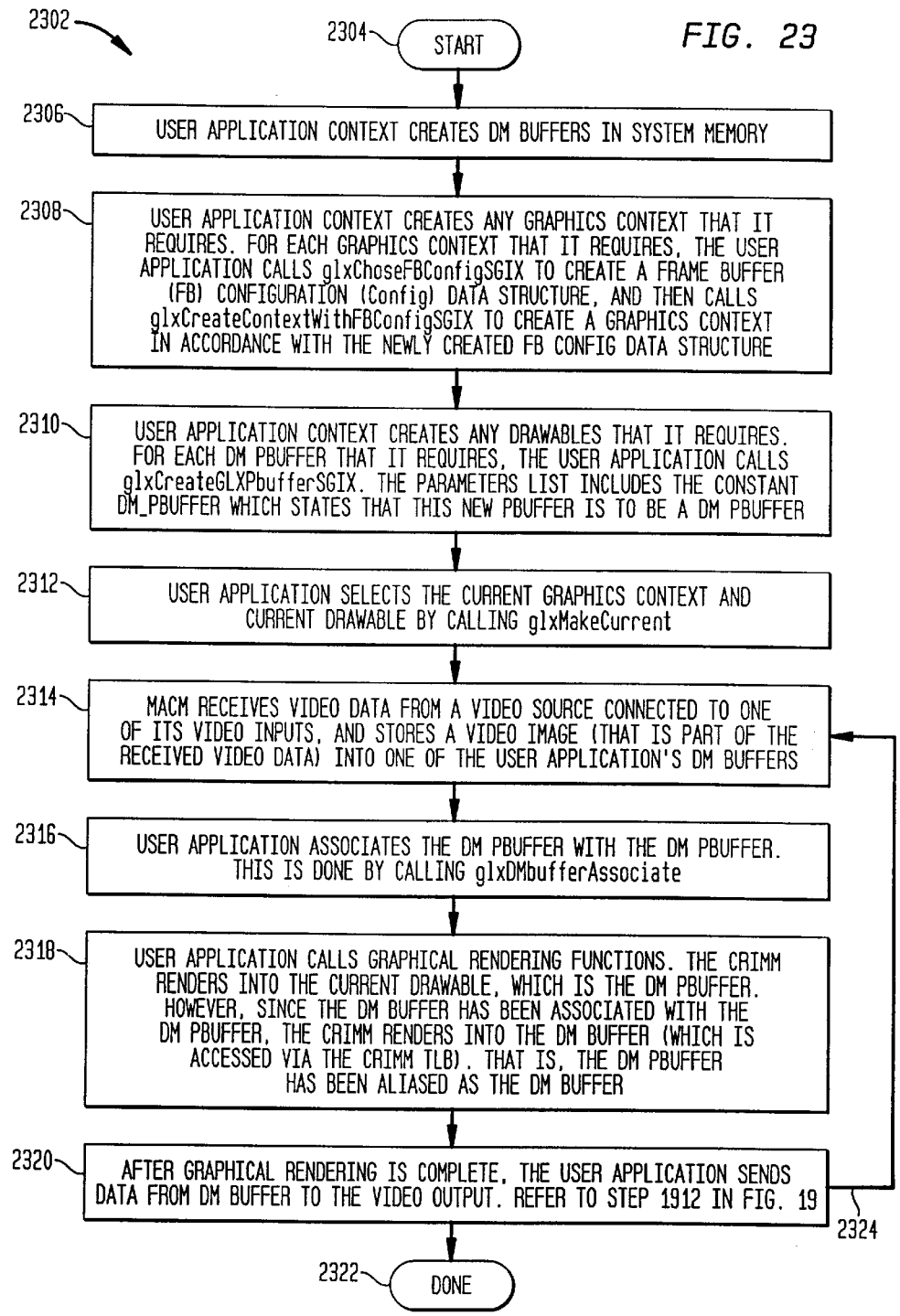
FIG. 23 is a flowchart depicting the operational steps of the scenario of FIG. 22.

The operation of the present invention shall now be further described by reference to FIG. 22, which illustrates a scenario 2202 where the CRIMM 308 is rendering to a drawable 2114A. The drawable 2114A is a DM Pbuffer, and its color buffer identifier 2704 identifies a DM buffer 2104A in the user application memory 2102. A flowchart 2302 in FIG. 23 depicts the operational steps associated with the scenario 2202 of FIG. 22.

In step 2306, a user application context 2260 creates a plurality of DM buffers 2104, such as DM buffer 2104A, in system memory 306. This is done by calling appropriate functions from the software libraries 1810 (FIG. 18).

In step 2308, the user application context 2260 creates any graphics contexts 2110 that it requires. For each graphics context 2110 that it requires, the user application context 2260 calls glxChoseFBConfigSGIX to create a FB config instance, and then calls glxCreateContextWithFBConfigSGIX to create a graphics context in accordance with the newly created FB config instance.

In step 2310, the user application context 2260 creates any drawables 2114 that it requires. For each DM Pbuffer drawable 2114A, 2114B that it requires, the user application context 2260 calls glxCreateGLXPbufferSGIX. The parameters list includes the constant DM_PBUFFER, which states that this new Pbuffer is to be a DM Pbuffer.

In step 2312, the user application context 2260 selects the current graphics context and current drawable by calling glxMakeCurrent. In the scenario of FIG. 22, graphics context 2110B and drawable 2114A have been made current.

In step 2314, the MACM 314 receives video data 2204 from a video source 318 connected to one of its video inputs, and stores a video image 2206 (that is part of the received video data 2204) into one of the user applications DM buffers 2104A. This operation is similar to steps 1006, 1008, and 1010 in FIG. 10, described above.

In step 2316, the user application context 2260 associates the DM buffer 2104A with the DM Pbuffer 2114A. This is done by calling glxDMBufferAssociate (also called glxAssociateDMPbuffer in some implementations). The operating system loads the CRIMM TLB 2004 with addresses of tiles that form the DM buffer 2104A associated with this current drawable 2114A.

In step 2318, the user application context 2260 calls graphical rendering functions. These functions may operate to draw a title or other graphics over the video image 2206 in the DM buffer 2104A, for example. In accordance with these graphical rendering functions, the CRIMM 308 renders into the current drawable, which is the DM Pbuffer 2114A. However, since the DM buffer 2104A has been associated with the DM Pbuffer 2114A, the CRIMM 308 actually renders into the DM buffer 2104A (which is accessed via the CRIMM TLB 2004). That is, the DM Pbuffer 2114A has been aliased as the DM buffer 2104A.

After graphical rendering is complete, the user application context 2260 in step 2320 sends data from DM buffer 2104A to the video output. This is described with reference to step 1912 in FIG. 19, described above.

The above can be an iterative process, as indicated by control flow arrow 2324 (although step 2316 only need be performed once for a given DM buffer/DM Pbuffer pair).

It is noted that the CRIMM 308 can also render into an empty DM buffer. This functionality is applicable to animation applications, for example.

Scenario 5: Manipulation of Data in DM Buffers by User Applications

The above discussion has primarily focused on direct data manipulation by the VICM 326 and the CRIMM 308. According to the present invention, however, any component with direct access to the system memory 306 can directly manipulate data stored in DM buffers within the system memory 306.

Figure 24:
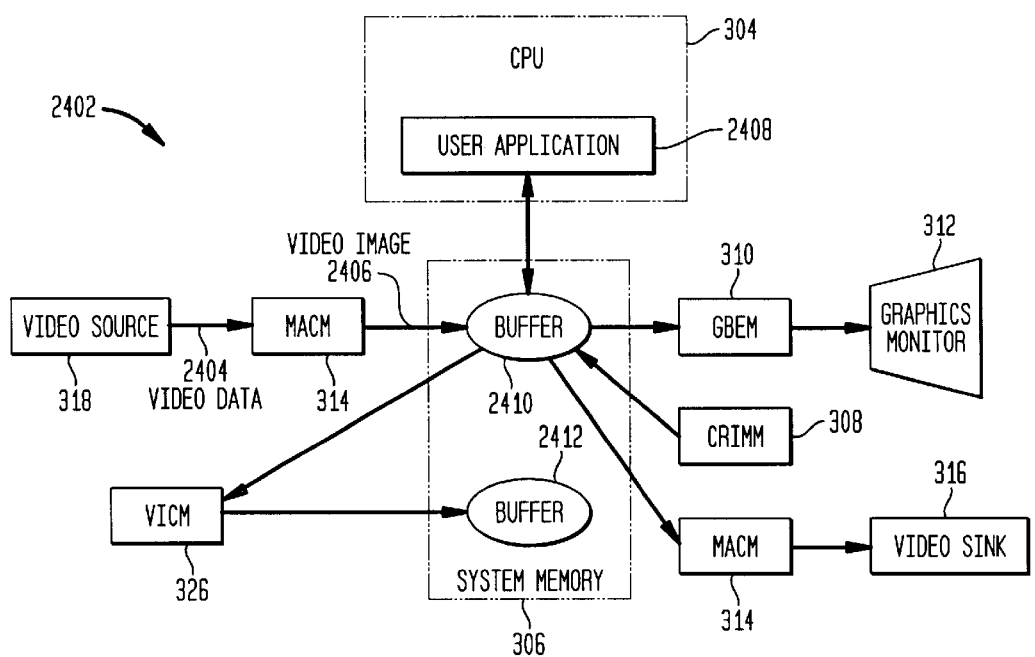
FIG. 24 illustrates a scenario where a user application and other elements of the invention manipulate data stored in a DM buffer.
Figure 25:
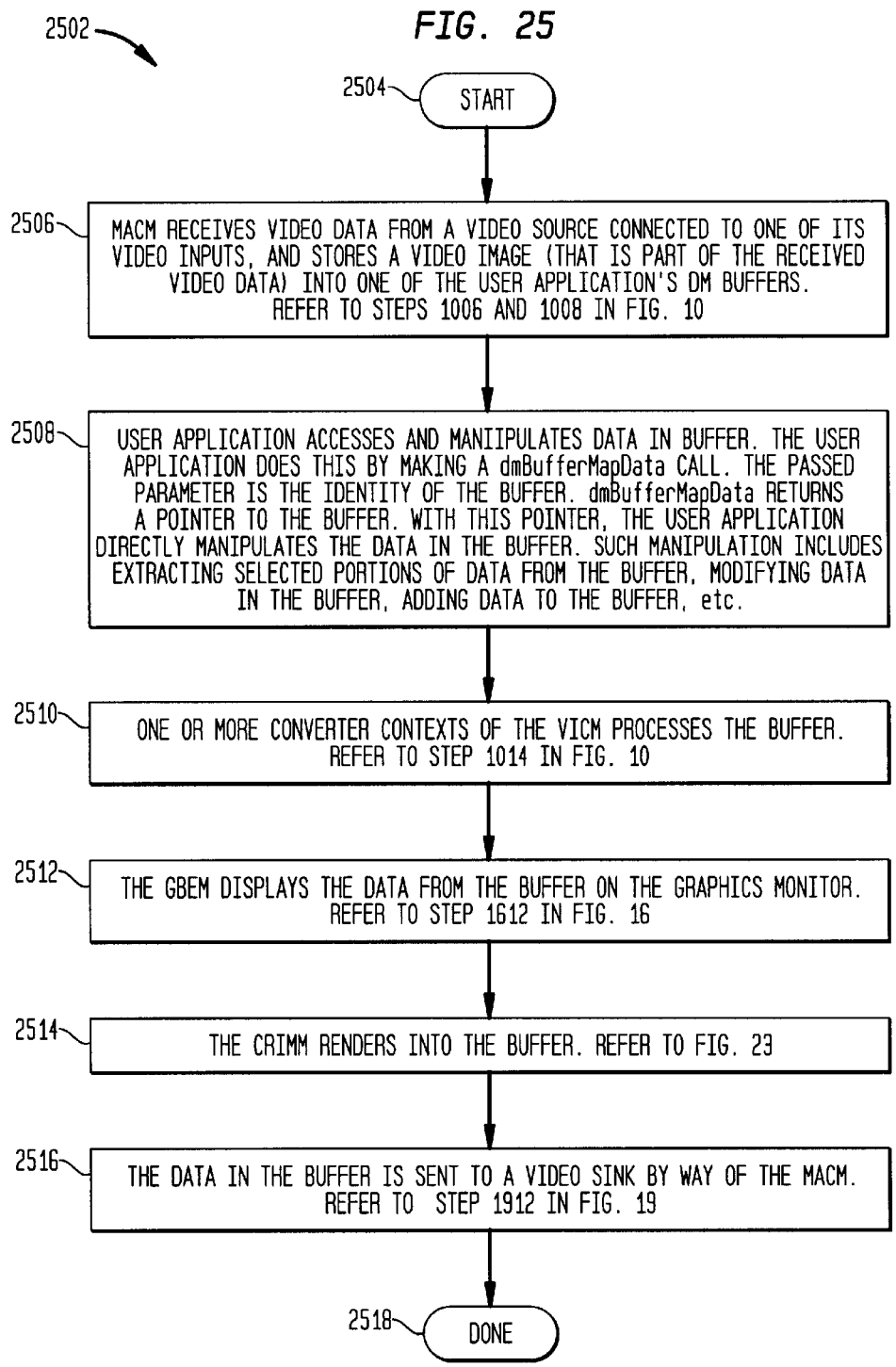
FIG. 25 is a flowchart depicting the operational steps of the scenario of FIG. 24.

FIG. 24 illustrates a scenario 2402 where a user application 2408 executing in the CPU 304 is directly manipulating data in a DM buffer 2410. FIG. 25 illustrates a flowchart 2502 depicting the operational steps that take place in the scenario 2402 of FIG. 24.

In step 2506, the MACM 314 receives video data 2404 from a video source 318 connected to one of its video inputs, and stores a video image 2406 (that is part of the received video data 2404) into one of the user application's DM buffers 2410. This operation is described above with reference to steps 1006, 1008, and 1010 in FIG. 10.

In step 2508, the user application 2408 accesses and manipulates data in the DM buffer 2410. The user application 2408 does this by making a dmBufferMapData call. The passed parameter is the identity of the buffer 2410. dmBufferMapData returns a pointer to the buffer 2410. With this pointer, the user application 2408 directly manipulates the data in the buffer 2410. Such manipulation may include extracting selected portions of data from the buffer 2410, modifying data in the buffer 2410, adding data to the buffer 2410, or any other type of data manipulation.

In step 2510, one or more converter contexts of the VICM 326 processes the buffer 2410. The result of these operations may be stored in another DM buffer 2412. This operation is described above with reference to FIG. 10.

In step 2512, the GBEM 310 displays the data from the buffer 2410 on the graphics monitor 312. This operation is described above with reference to FIG. 16.

In step 2514, the CRIMM 308 renders into the buffer 2410. This operation is described above with reference to FIG. 23.

In step 2516, the data in the buffer 2410 is sent to a video sink by way of the MACM 314. This operation is described above with reference to FIG. 19.

Steps 2508, 2510, 2512, 2514, and/or 2516 may be performed serially, or in parallel. Also, any combination of steps 2508, 2510, 2512, 2514, and 2516 may be performed in parallel. This illustrates another advantage of the invention. The system memory 306 is common to the CPU 304, the CRIMM 308, the GBEM 310, the MACM 314, and the VICM 326. Thus, the DM buffers in the system memory 306 are common to the CPU 304, the CRIMM 308, the GBEM 310, the MACM 314, and the VICM 326. Accordingly, the data in a DM buffer can be simultaneously manipulated by any combination of the CPU 304, the CRIMM 308, the GBEM 310, the MACM 314, and the VICM 326.

It is not necessary to copy data from one memory unit to another memory unit, or from one memory location to another memory location within the same memory unit, in order to achieve this functionality. Thus, the present invention provides for great flexibility in the manipulation of data. This flexibility is not achieved at the cost of performance.

Texture Mapping

DM buffers can be used in a great many other contexts and applications. Texture mapping is one such application.

Figure 28:
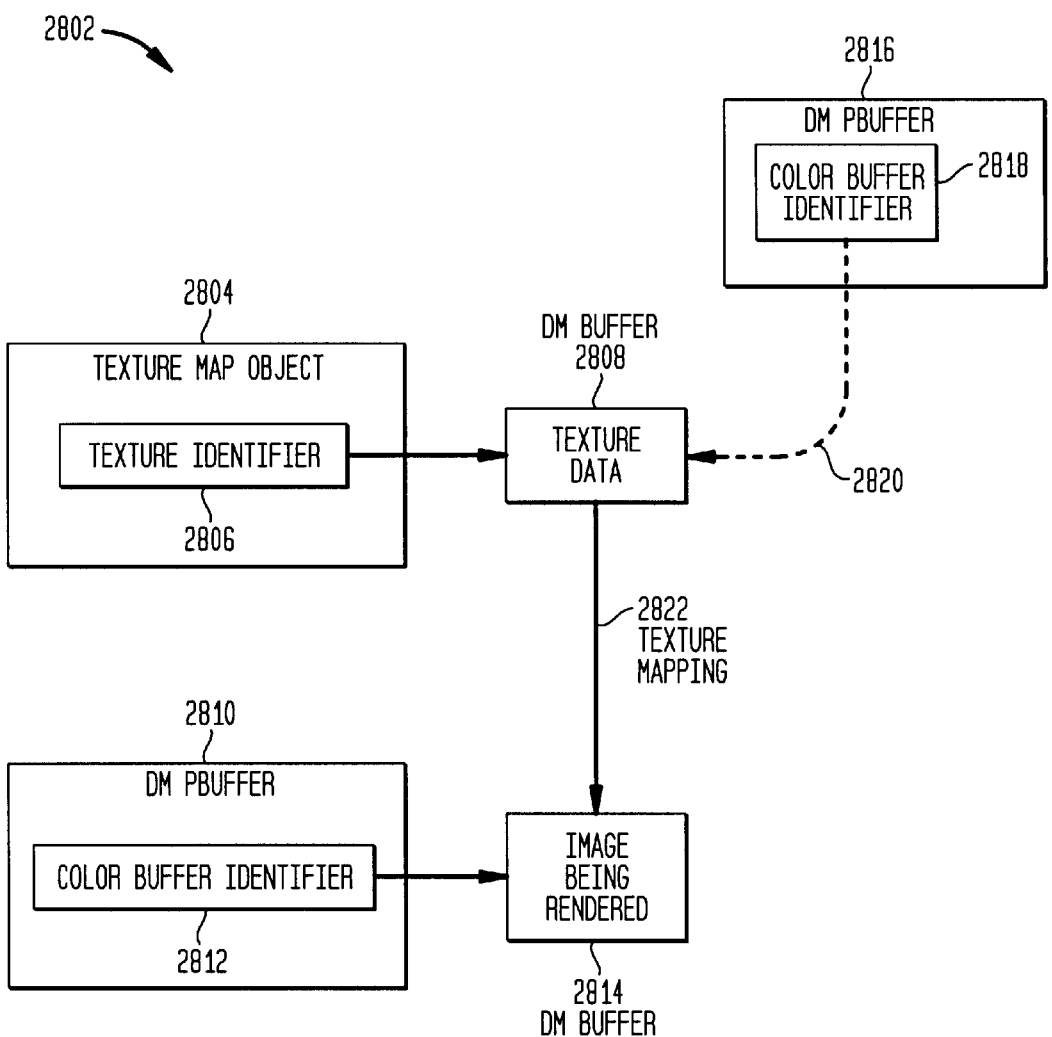
FIG. 28 illustrates a texture mapping scenario involving a texture map object according to an embodiment of the invention.

In an embodiment of the invention, a texture map object 2804 representative of a texture includes a texture identifier 2806 (see FIG. 28). The texture map object 2804 does not itself store texture data. Instead, the texture identifier 2806 points to a DM buffer 2808 that stores texture data More particularly, the texture identifier 2806 is a memory location that stores a pointer to the DM buffer 2808 having texture data stored therein. The texture map object 2804 is said to be associated with, or aliased as, the DM buffer 2808. During texture mapping operations, the texture data in the DM buffer 2808 is used. This DM buffer 2808 is accessed by reference to the texture identifier 2806 in the texture map object 2804.

An example operation of this embodiment of the invention is represented by a flowchart 2902 in FIG. 29. In step 2906, data is generated and stored in a DM buffer 2808 that is associated with a DM Pbuffer 2816 (this association is graphically indicated by dotted line 2820). Such data in the DM buffer 2808 may be the result of multiple graphics rendering and/or image conversion operations which are initiated by a user application. As should be clear from the following discussion, the data in the DM buffer 2808 need not be copied from one place to another in order to use it for texture mapping.

In step 2908, the user application creates a Texture Map Object 2804.

In step 2910, the user application causes the pointer in the color buffer identifier 2818 of the DM Pbuffer 2816 to be copied to the texture identifier 2806 of the texture map object 2804. As a result, the texture map object 2804 becomes associated with the DM buffer 2808. In other words, the texture map object 2804 becomes associated with the texture data in the DM buffer 2808.

In step 2912, the user application causes the texture associated with the texture map object 2804 to be mapped to the image data associated with the DM Pbuffer 2810. According to the invention, the DM buffer 2808 is accessed by referenced to the texture identifier 2806 of the texture map object 2804. The texture data in the DM buffer 2808 is then mapped (in accordance with command(s) issued by the user application) to the image stored in the DM buffer 2814, which is accessed by reference to the color buffer identifier 2812 of the DM Pbuffer 2810.

Conclusion

While various embodiments of the present invention have been described above, it should be understood that they have been presented by way of example only, and not limitations Thus, the breadth and scope of the present invention should not be limited by any of the above-described exemplary embodiments, but should be defined only in accordance with the following claims and their equivalents.

What is claimed Is:

1. A method of rendering images in a system memory, comprising the steps of:

(1) creating a digital media (DM) Pbuffer in the system memory;

(2) aliasing said DM Pbuffer as a DM buffer in the system memory; and (3) processing graphical operations directed to said DM Pbuffer by rendering to said DM buffer in the system memory.

2. The method of claim 1, wherein said DM Pbuffer comprises a color buffer identifier, and wherein step (2) comprises the step of:

storing in said color buffer identifier of said DM Pbuffer an identifier of said DM buffer.

3. The method of claim 1, further comprising the following steps that are performed before step (3):

creating a graphics context;

making said graphics context a current context; and making said DM Pbuffer a current drawable.

4. The method of claim 1, further comprising the following steps that are performed before step (3):

receiving real-time video data comprising a video image; and storing the video image in said DM buffer.

5. The method of claim 1, further comprising the steps of:

(4) aliasing a texture map object as said DM buffer; and (5) processing texture mapping operations involving said texture map object by using texture data stored in said DM buffer.

6. A computer system, comprising:

a system memory;

a central processing unit coupled directly to said system memory;

a graphics rendering unit coupled directly to said system memory and configured to process video images in said system memory; and a user application executing in said central processing unit, said user application configured to cause, a digital media (DM) Pbuffer to be created in said system memory and configured to cause said DM Pbuffer to be aliased as a DM buffer in said system memory, said user application configured to invoke graphical functions directed to said DM Pbuffer.

7. The computer system of claim 6, wherein said graphics rendering unit is configured to render to said DM buffer in accordance with said invoked graphical function.

8. The computer system of claim 6, wherein said user application is configured to use an identifier of said DM buffer to be stored in said color buffer identifier of said DM Pbuffer.

9. The computer system of claim 6, wherein said user application is configured to alias a texture map object as said DM buffer and to process texture mapping operations involving said texture map object by using texture data stored in said DM buffer.

10. A method of texture mapping, comprising the steps of:

(1) aliasing a texture map object as a first DM buffer, said first DM buffer storing texture data;

(2) aliasing a drawable as a second DM buffer, said second DM buffer storing image data; and (3) mapping said texture map object to said drawable by mapping said texture data in said first DM buffer to said image data in said second DM buffer.

11. A system for texture mapping, comprising:

means for aliasing a texture map object as a first DM buffer, said first DM buffer storing texture data;

means for aliasing a drawable as a second DM buffer, said second DM buffer storing image data; and means for mapping said texture map object to said drawable by mapping said texture data in said first DM buffer to said image data in said second DM buffer.

12. A computer program product comprising a computer useable medium having computer program logic recorded therein, said computer program logic enabling a processor in a computer to render images in a system memory coupled to the processor, said computer program logic comprising:

a procedure that enables the processor to create a digital media (DM) Pbuffer in the system memory;

a procedure that enables the processor to alias said DM Pbuffer as a DM buffer in the system memory; and a procedure that enables the processor to process graphical operations directed to said DM Pbuffer by rendering to said DM buffer.

13. A computer program product comprising a computer useable medium having computer program logic recorded therein, said computer program logic enabling a processor in a computer to perform texture mapping in a system memory coupled to the processor, said computer program logic comprising:

a procedure that enables the processor to alias a texture map object as a first DM buffer in the system memory, said first DM buffer storing texture data;

a procedure that enables the processor to alias a drawable as a second DM buffer in the system memory, said second DM buffer storing image data; and a procedure that enables the processor to map said texture map object to said drawable by mapping said texture data in said first DM buffer to said image data in said second DM buffer.

14. A computer system, comprising:

a system memory;

a central processing unit coupled directly to said system memory;

a graphics rendering unit coupled directly to said system memory and configured to process video images in said system memory; and a user application executing in said central processing unit, said user application including, means for causing a digital media (DM) Pbuffer to be created in said system memory, aliasing means for causing said DM Pbuffer to be alised as a DM buffer in said system memory, and means for invoking graphical functions directed to said DM Pbuffer.

* * * * *